United States Patent [19]
Odaka et al.

[11] Patent Number: 5,807,205
[45] Date of Patent: Sep. 15, 1998

[54] ELECTRIC VEHICLE PARKING LOCK DEVICE CONTROL APPARATUS, ADAPTED TO ACTIVATE ELECTRIC MOTOR TO REDUCE ENGAGEMENT LOAD BETWEEN LOCK GEAR AND PAWL UPON RELEASING OF LOCK

[75] Inventors: Kenji Odaka; Kinya Yoshii; Takeharu Koide, all of Toyota, Japan

[73] Assignee: Toyota Jidosha Kabushiki Kaisha, Toyota, Japan

[21] Appl. No.: 844,676

[22] Filed: Apr. 21, 1997

[30] Foreign Application Priority Data

Apr. 22, 1996 [JP] Japan .................................... 8-100035

[51] Int. Cl.⁶ ...................................................... B60T 1/06
[52] U.S. Cl. .................................. 477/29; 477/901; 477/20
[58] Field of Search .................................. 477/15, 20, 29, 477/901

[56] References Cited

U.S. PATENT DOCUMENTS

| 5,139,121 | 8/1992 | Kumura et al. | 477/29 |
| 5,287,772 | 2/1994 | Aoki et al. | 477/20 |
| 5,403,244 | 4/1995 | Tankersley et al. | 477/20 |

FOREIGN PATENT DOCUMENTS

| 1-38022 | 8/1989 | Japan . |
| 2-24702 | 5/1990 | Japan . |
| 4-63750 | 2/1992 | Japan . |

*Primary Examiner*—Dirk Wright
*Attorney, Agent, or Firm*—Oblon, Spivak, McClelland, Maier & Neustadt, P.C.

[57] ABSTRACT

An apparatus for controlling a mechanical parking lock device of an electric vehicle including an electric motor, the mechanical parking lock device including a parking lock gear rotated with a wheel of the vehicle, a parking lock pawl having a lock position for engagement of the lock pawl with the lock gear to lock the wheel, and an unlock position for releasing the lock pawl from the lock gear, and an engaging member mechanically linked with a shift lever, for engagement of the engaging member with the lock pawl to bring the pawl into the lock position upon operation of the shift lever to a parking position, and for permitting the lock pawl to be moved to the unlock position upon operation of the shift lever from the parking position to another position, the apparatus including a parking release intention determining device for determining an intention of a vehicle operator of operating the shift lever from the parking position to another position, and a parking release motor control device, which is operable upon determination of the operator's intention by the parking release intention determining device, for activating the electric motor so as to reduce a load of engagement between the lock gear and the lock pawl.

10 Claims, 15 Drawing Sheets

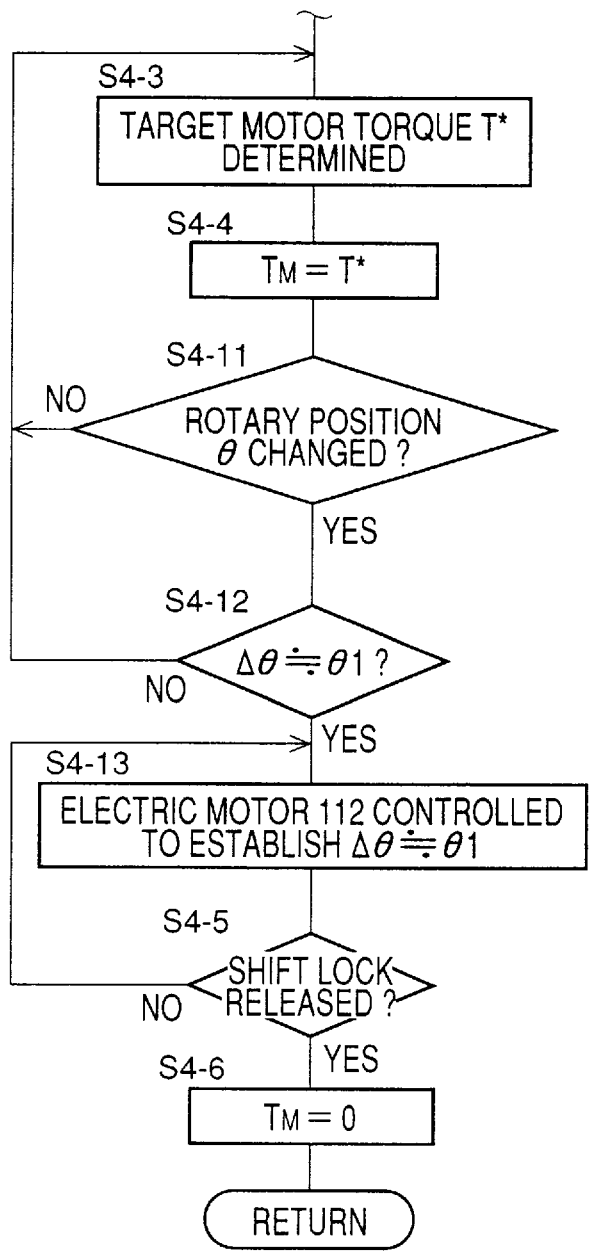

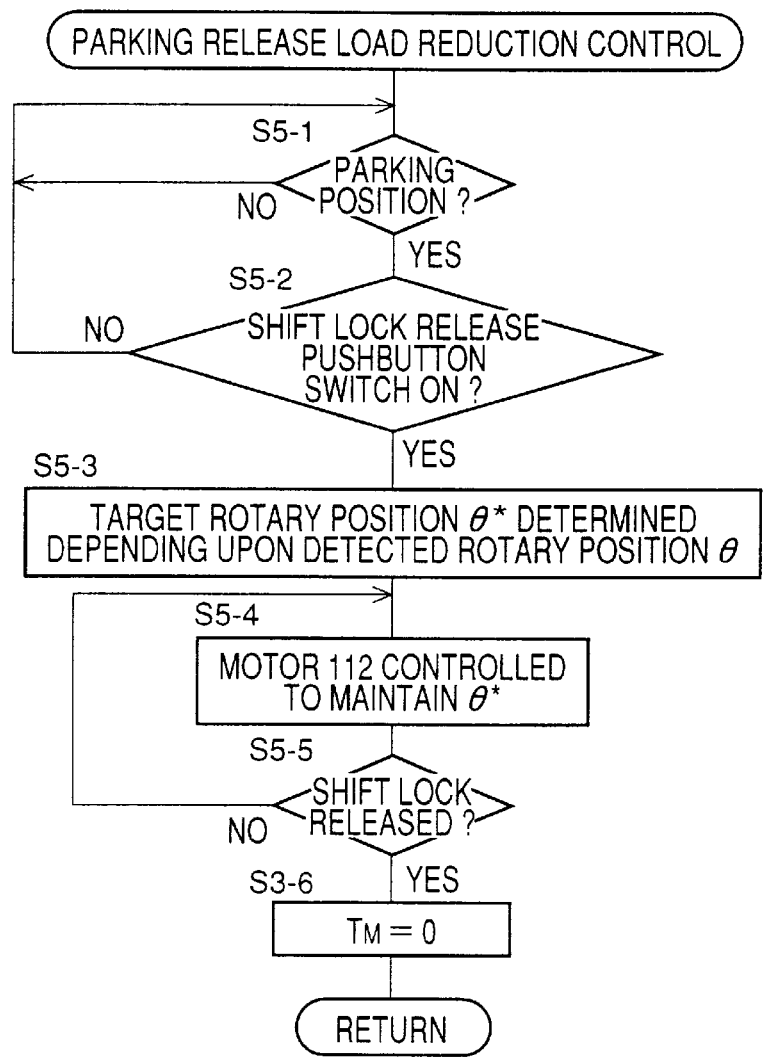
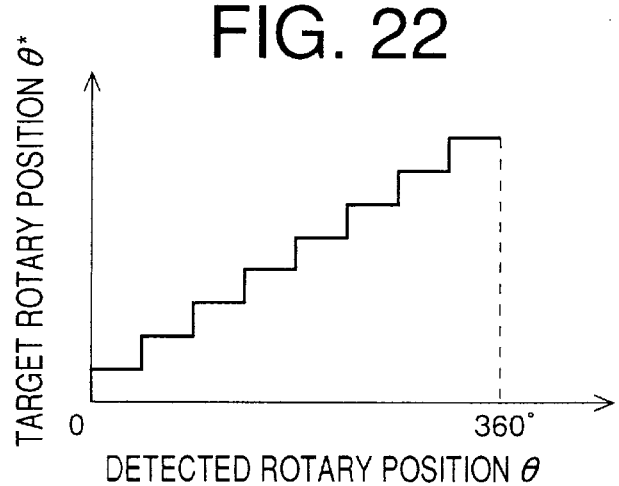

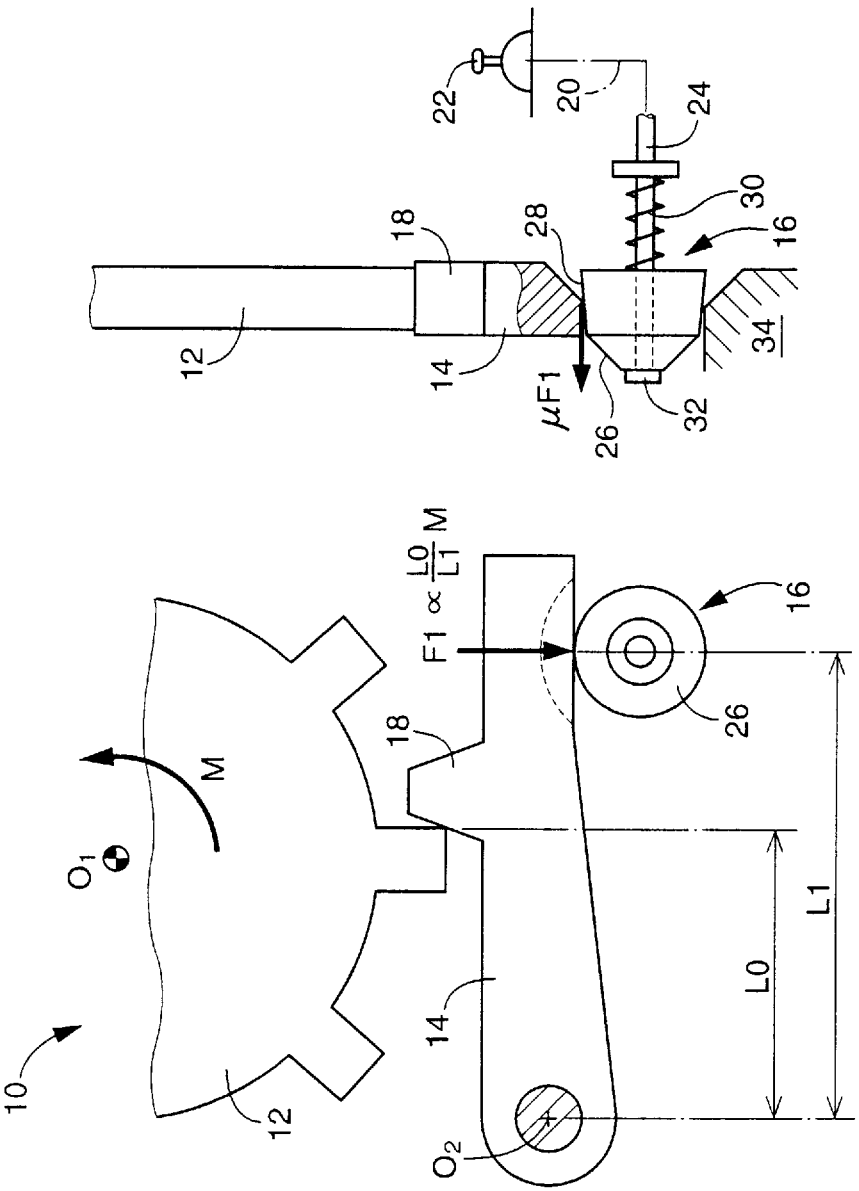

ELECTRIC VEHICLE PARKING LOCK DEVICE CONTROL APPARATUS, ADAPTED TO ACTIVATE ELECTRIC MOTOR TO REDUCE ENGAGEMENT LOAD BETWEEN LOCK GEAR AND PAWL UPON RELEASING OF LOCK

This application is based on Japanese Patent Application No. 8-100035 filed Apr. 22, 1996, the content of which is incorporated hereinto by reference.

BACKGROUND OF THE INVENTION

1. Field of the Invention

The present invention relates in general to a mechanical parking lock device for mechanically locking a wheel of an electric vehicle having an electric motor as a drive power source, upon operation of a shift lever to a parking position, and more particularly, to an apparatus for controlling such a mechanical parking lock device using the electric motor for reducing a load of engagement between a lock gear and a lock pawl, to thereby facilitate the operation of the shift lever from the parking position to another position.

2. Discussion of the Related Art

An example of a mechanical parking lock device is disclosed in JP-B-2-24702, which includes (a) a parking lock gear rotated with a wheel of a motor vehicle, (b) a parking lock pawl having a lock position in which the parking lock pawl is engaged with the parking lock gear to lock the wheel, and an unlock position in which the parking lock pawl is disengaged from the parking lock gear, and (c) an engaging member mechanically linked with a shift lever such that the engaging member is engaged with the parking lock pawl to bring the pawl into the lock position when the shift lever is operated to a parking position, and such that the engaging member permits the pawl to be moved to the unlock position when the shift lever is operated from the parking position to another position. This type of mechanical parking lock device is widely used on a motor vehicle having an automatic transmission, and is also used on an electric vehicle equipped with an electric motor as a drive power source for driving the vehicle.

Referring to FIGS. 23A and 23B, there is shown an example of a known mechanical parking lock device generally indicated at 10. The mechanical parking lock device 10 includes a parking lock gear 12, a parking lock pawl 14, and an engaging member 16. The parking lock gear 12 has a multiplicity of teeth formed in a circumferential direction thereof. For example, the parking lock gear 12 is coaxially connected to a propeller shaft or other member provided to rotate a drive wheel of the vehicle via a differential gear device. The lock gear 12 is rotatable about a first axis 01. The parking lock pawl 14 has a tooth 18, and is rotatable or pivotable about a second axis 02 substantially parallel to the first axis 01, between a lock position for engagement of the tooth 18 with the teeth of the lock gear 12 to lock the drive wheel of the vehicle, and an unlock position for disengagement of the tooth 18 from the teeth of the lock gear 12 to permit the drive wheel to rotate. The parking lock pawl 14 shown in FIGS. 23A and 23B is placed in the lock position.

The engaging member 16 is disposed on a rod 24, which is mechanically linked through suitable linking means with a shift lever 22 provided adjacent to an operator's seat of the motor vehicle. The linking means may be a push-pull cable or a link mechanism. When the shift lever 22 is operated to a parking position for parking the motor vehicle, the engaging member 16 is linearly moved with the rod 24 in a left direction as seen in FIG. 23B, so that the engaging member 16 is engaged with the parking lock pawl 14, so as to bring the lock pawl 14 into the lock position. FIG. 23B is a right side elevational view of FIG. 23A.

The engaging member 16 includes a first cam portion 26 having a relatively large angle of inclination, and a second cam portion 28 which is contiguous with the first cam portion 26 and which has a relatively small angle of inclination. The first cam portion 26 functions to bring the lock pawl 14 into the lock position, while the second cam portion 28 functions to hold the lock pawl 14 in the lock position, with a frictional contact between the second cam portion 28 and the lock pawl 14. The engaging member 16 is disposed on the rod 24 such that the engaging member 16 is axially movable relative to the rod 24. The rod 24 has a head 32 at one end thereof, and is provided with an elastic member in the form of a compression coil spring 30. Normally, the engaging member 26 is held in abutting contact with the head 32 of the rod 24 under a biasing force of the coil spring 30. This arrangement permits the shift lever 22 to be operated to the parking position, even when the tooth 18 of the lock pawl 14 is in contact with the top face of one of the teeth of the lock gear 12. The biasing action of the compression coil spring 30 causes the lock pawl 14 to be moved to the lock position if the lock gear 12 is rotated in the above condition, due to rotation of the wheel of the vehicle when it is parked on a slope, for example. A stationary suitable support member 34 is disposed on one side of the engaging member 16 remote from the lock pawl 14, so that the engaging member 16 is prevented from moving in a direction away from the lock pawl 14.

While the engaging member 16 used in the mechanical parking lock device 10 of FIGS. 23A and 23B is adapted to be moved in a direction substantially parallel to the first and second axes 01, 02 indicated above, the direction of movement of the engaging member may be suitable determined. The engaging member 16 may be replaced by an engaging member which is pivotable about a third axis for engagement with the lock pawl 14 to bring the lock pawl 14 into the lock position. In this case, the lock pawl 14 is locked at a position adjacent to change point, by a suitable member such as a stopper.

Where the motor vehicle provided with the conventional mechanical parking lock mechanism as described above is parked on a slope, a load acts on the vehicle in a longitudinal direction of the vehicle, whereby a moment acts on the parking lock gear 12. This moment causes the lock pawl 14 to be forced onto the engaging member 16. When the shift lever 22 is operated from the parking position to another position (usually, a reverse position) in the above condition, a relatively large force is required to operate the shift lever 22 from the parking position. Described in detail referring to FIGS. 23A and 23B, a load F1 acting on the engaging member 16 is proportional to M×L0/L1, where M represents the moment of the lock gear 12, while L0/L1 represents a lever ratio with respect to the second axis 02. Further, a friction force $\mu$F1 exists due to a friction coefficient $\mu$ between the second cam portion 28 and the lock pawl 14. Therefore, the force required for moving the shift lever 22 from the parking position increases with an increase in the moment M, namely, with an increase in the gradient of the slope.

Although the second cam portion 28 has an inclined surface for facilitating the operation of the shift lever 22 from the parking position to another position, an increase in the angle of inclination of the second cam portion may cause the engaging member 16 to be disengaged from the pawl 14 due to the load F1, against the biasing action of the compression coil spring 30. Therefore, there is an upper limit of the angle of inclination of the second cam portion 28. The lever ratio L0/L1 is reduced to reduce the load F1 by increasing the distance L1 or reducing the distance L0. However, this solution may undesirably result in a decrease in the engaging stroke of the lock pawl 14 and the lock gear 12. To reduce the lever ratio L0/L1 while assuring a sufficient engaging stroke of the lock pawl 14 and the lock gear 12, it is required to increase the operating stroke of the engaging member, undesirably leading to an increase in the required operating stroke of the shift lever 22. The reduction of the distance L0 may suffer from reduced mechanical strength of the lock pawl 14 and the lock gear 12. The shift lever 22 may be given an increased boosting function or lever ratio if the length of the shift lever 22 from the floor or steering column of the vehicle is increased. However, this solution cause another problem, that is, reduced ease of operation of the shift lever 22 and increased space required for installation of the shift lever 22.

In the mechanical parking lock device wherein the engaging member is pivotable about the third axis and the lock pawl is locked at a position adjacent to the change point, as described above, the engaging member should be pivoted against the load F1 upon operation of the shift lever from the parking position to another position. Therefore, this type of parking lock device also requires a large force for operating the shift lever from the parking position when the moment M is relatively large as in the case where the vehicle is parked on a slope.

SUMMARY OF THE INVENTION

It is therefore an object of the present invention to provide an apparatus for controlling a mechanical parking lock device of an electric vehicle equipped with an electric motor as a drive power source, which apparatus permits the shift lever to be operated from a parking position to another position with a comparatively small operating force, while avoiding deterioration of the parking lock function of the parking lock device and the ease of operation of the shift lever.

The above object may be achieved according to the principle of the present invention, which provides an apparatus for controlling a mechanical parking lock device of an electric vehicle including an electric motor as a drive power source for driving the electric vehicle, the mechanical parking lock device including (a) a parking lock gear rotated with a wheel of the electric vehicle, (b) a parking lock pawl having a lock position in which the parking lock pawl is engaged with the parking lock gear to lock the wheel, and an unlock position in which the parking lock pawl is disengaged from the parking lock gear, and (c) an engaging member mechanically linked with a shift lever such that the engaging member is engaged with the parking lock pawl to bring the pawl into the lock position when the shift lever is operated to a parking position, and such that the engaging member permits the pawl to be moved to the unlock position when the shift lever is operated from the parking position to another position, the apparatus comprising: (i) parking release intention determining means for determining whether an operator of the electric vehicle has an intention of operating the shift lever from the parking position to the another position; and (ii) parking release motor control means, operable when the parking release intention determining means determines that the operator has the above-indicated intention, for activating the electric motor so as to reduce a load of engagement between the parking lock gear and the parking lock pawl.

The control apparatus of the present invention constructed as described above is adapted to activate the electric motor so as to reduce the load of engagement between the parking lock gear and the parking lock pawl of the mechanical parking lock device, when the operator of the vehicle operates the shift lever from the parking position to another position, whereby the required to operate the shift lever for releasing the mechanical parking lock of the vehicle wheel is significantly reduced. Therefore, the present control apparatus facilitates the operation of the shift lever from the parking position even when a considerably large load acts on the electric vehicle in the longitudinal direction as in the case of parking on a relatively steep slope. Further, the present control apparatus which utilizes the electric motor does not require a change of design of the mechanical parking lock device, to facilitate the operation of the shift lever during parking of the electric vehicle. Accordingly, the control apparatus is available at a relatively low cost.

The principle of the present invention is applicable to any electric vehicle equipped with an electric motor as a drive power source. The electric vehicle may be a hybrid drive vehicle having an engine such as an internal combustion engine, which is operated by combustion of a fuel, as another drive power source or as a device for charging the electric motor. The parking lock gear may be disposed in a power transmitting path between the electric motor and the drive wheel. However, the lock gear may be disposed such that the lock gear is rotated with a driven or idler wheel of the electric vehicle. The electric motor and the drive wheel are desirably connected to each other either directly or through a suitable speed reducing mechanism, such that the drive wheel is rotated when the electric motor is operated. However, a clutch or other device may be provided to selectively connect and disconnect the electric motor and the drive wheel to and from each other, provided that the electric motor is connected to the drive wheel when the parking release motor control means is operated to activate the electric motor so as to reduce the load between the lock gear and the lock pawl, upon operation of the shift lever from the parking position to another position. Where the lock gear is disposed in a power transmitting path which connects the electric motor and the drive wheel and which includes a speed reducing mechanism, the lock gear is preferably disposed between the electric motor and the speed reducing mechanism, for reducing the load of engagement between the lock gear and the lock pawl due to the gradient of the road surface on which the vehicle is parked.

In one preferred form of the present invention, the parking release intention determining means comprises parking release load determining means for determining whether a load acting on the shift lever upon operation thereof from the parking position to another position is larger than a predetermined threshold. In this instance, the parking release motor control means is activated when the parking release load determining means determines that the load acting on the shift lever is larger than the predetermined threshold. This form of the invention eliminates an unnecessary operation of the electric motor and a resulting power consumption, when the shift lever can be easily operated from the parking position, with a considerably small load of engagement acting the lock gear and the lock pawl as in the case of parking of the vehicle on a flat road surface. The parking release load determining means may include a strain gage or other load sensor disposed on the shift lever or in a linkage between the shift lever and the engaging member of the parking lock device.

Usually, the shift lever is provided with a shift lock release pushbutton, which should be depressed when the shift lever is operated from the parking position to another position. In this respect, the parking release intention determining means may include detecting means such as a switch for detecting the depression of the shift lock release pushbutton.

In a second preferred form of this invention, the parking release intention determining means comprises load detecting means for detecting the load of engagement between the parking lock gear and the parking lock pawl. In this case, the parking release motor control means is adapted to determine a torque and a direction of operation of the electric motor, on the basis of a magnitude and a direction of the load of engagement detected by the load detecting means. This form of the apparatus makes it possible to substantially zero the load of engagement between the lock gear and the lock pawl, by precise control of the torque and operating direction of the electric motor, whereby the required operating force of the shift lever upon releasing of the parking lock can be effectively and efficiently minimized.

In the above second preferred form of the control apparatus, the parking release motor control means may be adapted such that the electric motor is not activated to reduce the load of engagement of the parking lock device when the detected load of engagement is smaller than a predetermined threshold. This arrangement provides substantially the same advantage as the first preferred form of the invention.

In one advantageous arrangement of the second preferred form of the invention, the load detecting means comprises a vehicle inclination sensor for detecting an angle of inclination of the electric vehicle in a plane parallel to a longitudinal direction of the electric vehicle. This vehicle inclination sensor may be located at any desired position on the electric vehicle.

In another advantageous arrangement of the second preferred form of the invention, the load detecting means comprises a load sensor for detecting a longitudinal load which acts on the electric vehicle in a longitudinal direction due to a gradient of a road surface on which the electric vehicle is parked. This load sensor makes it possible to accurately detect the load of engagement of the lock gear and the lock pawl, irrespective of changes in the weight of a cargo and the number of passengers on the electric vehicle. This arrangement assures a relatively high degree of stability in minimizing the required operating force of the shift lever upon releasing of the parking lock of the vehicle wheel.

The load sensor provided according to the above advantageous arrangement of the second preferred form of the invention may be a strain gage or other sensor disposed on a tooth of the parking lock pawl for directly detecting the load of engagement with the parking lock gear. However, the load sensor may be disposed at any position in a load transmitting path between the vehicle wheel associated with the lock gear and the lock pawl or the engaging member (or a member associated with the engaging member), so that the longitudinal load of the vehicle may be detected at that position. The longitudinal load acting on the vehicle in the longitudinal direction due to the gradient of the road surface is proportional to the load of engagement between the lock gear and the lock pawl. Where the load sensor is not disposed in the power transmitting path between the electric motor and the drive wheel, for example, disposed on the lock pawl or the engaging member, the rotary position of the electric motor can be controlled in a feedback fashion so as to substantially zero the longitudinal load as detected by the load sensor. Where the electric vehicle has a friction type or other parking brake in addition to the mechanical parking lock device, the longitudinal load is detected by the load sensor after the parking brake is released.

In a third preferred form of the present invention, the parking release motor control means comprises means for changing a magnitude and a direction of an output torque of the electric motor according to a predetermined pattern as a function of time. This form of the invention does not require means for detecting the magnitude and direction of the load of engagement of the lock gear and lock pawl. Namely, the load of engagement can be substantially zeroed while this output torque of the electric motor is changed in the opposite directions. For instance, the output torque is first increased in the forward or positive direction at a suitable rate, and is then reduced in the reverse or negative direction at a suitable rate. During this change of the output torque of the electric motor, the shift lever can be easily operated from the parking position to another position, with a reduced operating force. This form of the control apparatus does not require the load sensor according to the second preferred form of the invention, leading to a reduced cost of manufacture of the control apparatus.

According to a fourth preferred form of this invention, the control apparatus further comprises a rotary position sensor for detecting a rotary position of the parking lock gear. In this form of the invention, the parking release motor control means comprises rotary position control means for controlling a rotary position of the electric motor, on the basis of the rotary position of the parking lock gear detected by the rotary position sensor, such that the parking lock gear and the parking lock pawl are held in a relative position in which the load of engagement therebetween is substantially zero. Since the lock gear is held in the position in which the load of engagement is substantially zero, the required operating force of the shift lever where the vehicle is parked on a slope is reduced to substantially the same extent as in the case where the vehicle is parked on a flat road surface. This arrangement permits a relatively reduced output torque of the electric motor and accordingly reduced power consumption for facilitating the operation of the shift lever upon releasing of the parking lock.

The means for controlling the rotary position of the electric motor may be adapted to rotate the lock gear and detect an angle of play of the lock gear with respect to the lock pawl, so that the rotary position of the electric motor is controlled so as to position the lock gear within the detected angle of play. Where the angle of play between the lock gear and the lock pawl is known, the means for controlling the rotary position of the electric motor may be adapted to control the electric motor for rotating the lock gear by an angle within the known angle of play. Where the rotary position of the lock gear with respect to a predetermined reference point can be detected, the desired or target rotary position of the lock gear may be obtained according to a predetermined relationship between the desired rotary position and the detected rotary position, so that the actual rotary position of the lock gear coincides with the obtained desired rotary position. Like the third preferred form of the invention, this arrangement eliminates the load detecting means.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIG. 20 is a flow chart illustrating a parking release load reduction control routine according to an eighth embodiment of the invention;

FIG. 21 is a flow chart illustrating a parking release load reduction control routine according to a ninth embodiment of the invention;

FIG. 22 is a graph indicating a relationship between detected rotary position of the lock gear and the target motor torque T*, which relationship is used in step S5-3 of the routine of FIG. 21; and FIGS. 23A and 23B are views showing a known mechanical parking lock device, for explaining problems solved by the present invention.

DETAILED DESCRIPTION OF THE PREFERRED EMBODIMENTS

Figure 1:
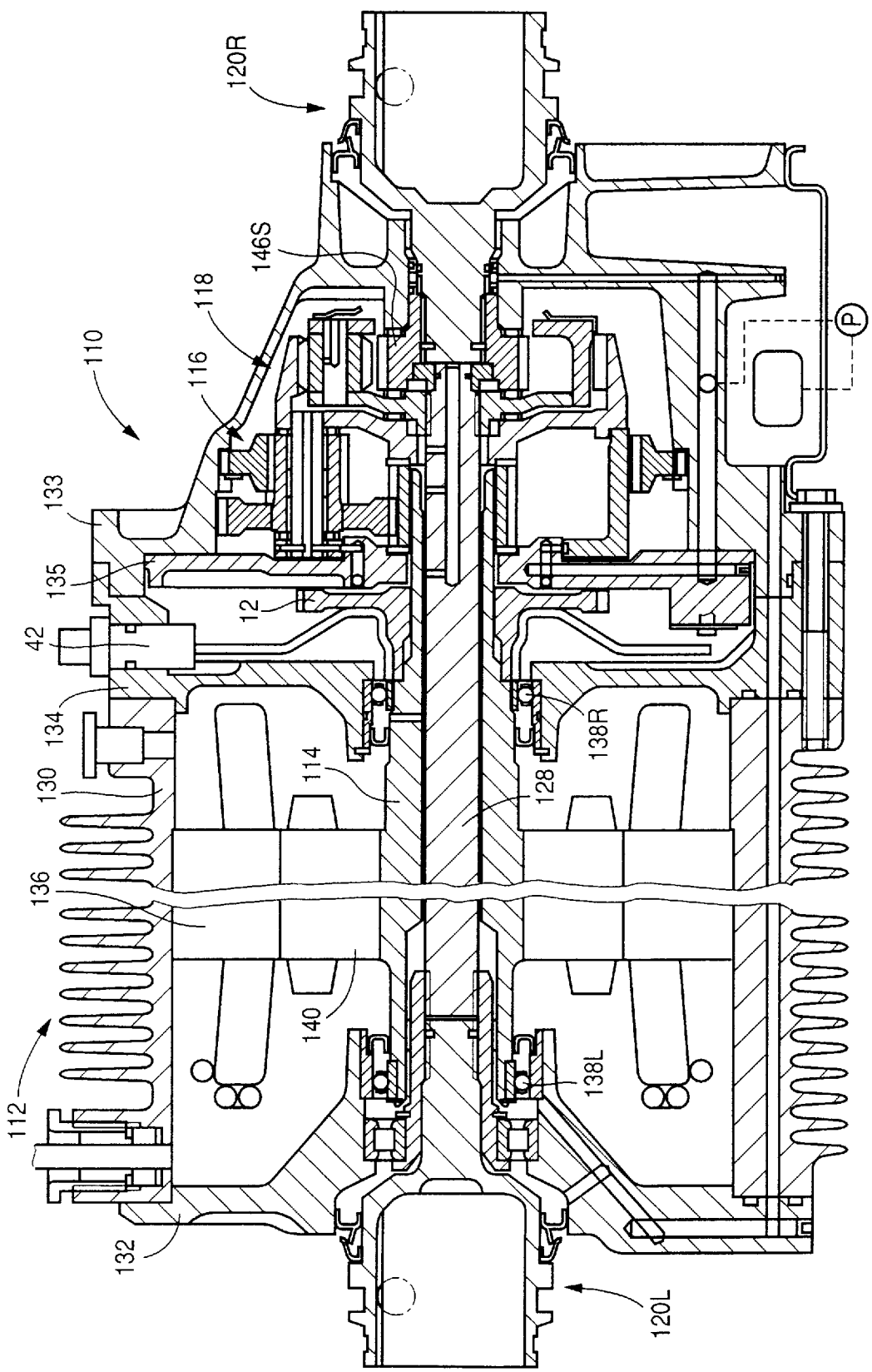
FIG. 1 is a partly cut-away elevational view in cross section of a power train of an electric vehicle to which the principle of the present invention is applicable.
Figure 2:
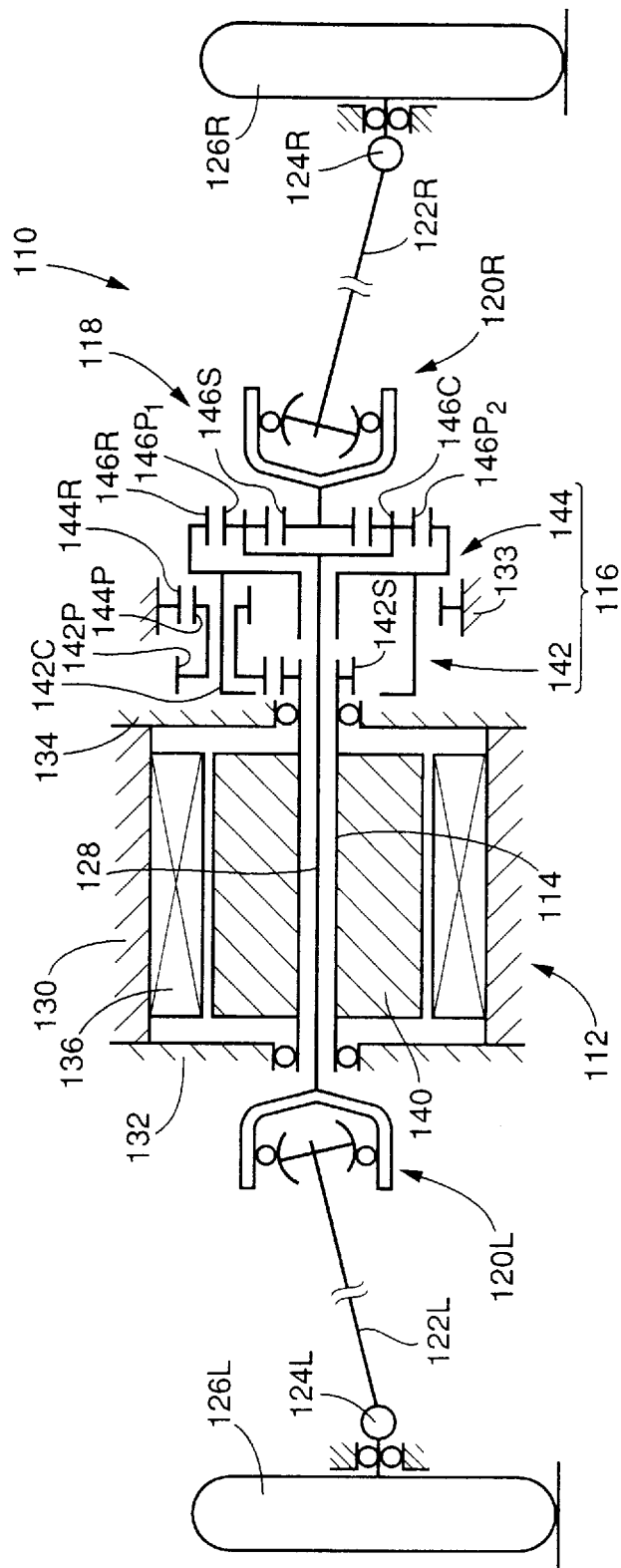
FIG. 2 is a schematic view of the power train of FIG. 1.
Figure 3:
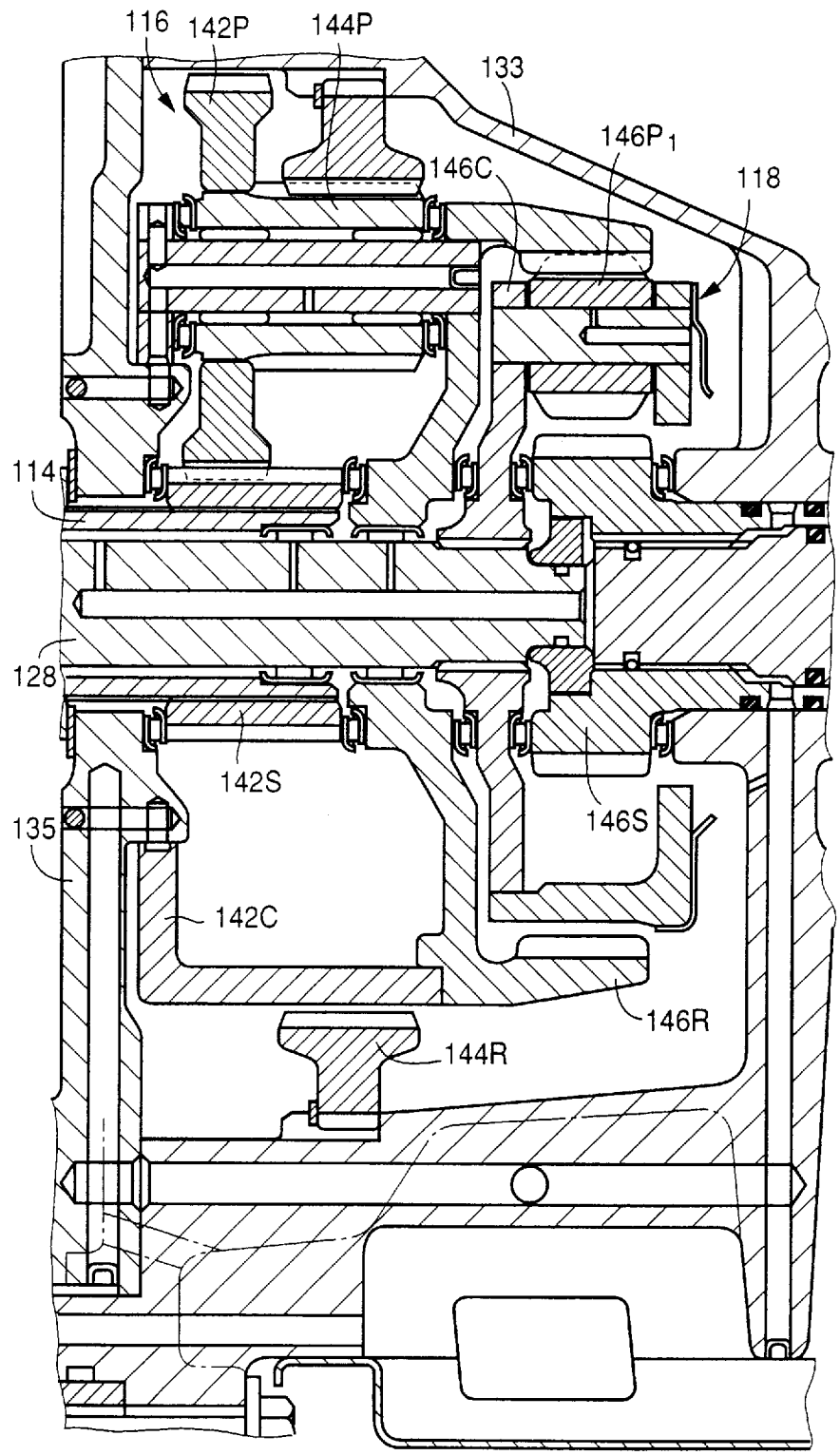
FIG. 3 is an elevational view in cross section showing in enlargement a transmission and a differential gear device of the power train of FIG. 1.

Referring first to the cross sectional view of FIG. 1 and the schematic view of FIG. 2, a power train 110 of an electric vehicle includes an electric motor 112 having a cylindrical drive shaft 113, an output of which is transferred to a transmission 116 functioning as a speed reducing mechanism. A rotary motion whose speed is reduced by the transmission 116 is distributed by a differential gear device 118 to left and right drive wheels 126L, 126R. The rotary motion is transferred to the left drive wheel 126L through: an inner shaft 128 coaxially extending through the cylindrical drive shaft 118 of the electric motor 112; a first left constant velocity universal joint 120L; a left axle 122L; and a second left constant velocity universal joint 124L. The rotary motion is transferred to the right drive wheel 126R through: a first right constant velocity universal joint 120R; a right axle 122R; and a second right constant velocity universal joint 124R. The left and right drive wheels 126L, 126R are rotatably supported by a suitable suspension system as well known in the art. The electric motor 112, transmission 116 and differential gear device 118 are coaxially disposed in series connection with each other in a composite housing consisting of five housing members, that is, a cylindrical housing 130, a first side housing 132, a second side housing 133, a first intermediate housing 134 and a second intermediate housing 135. The cross sectional view of FIG. 3 shows details of the transmission 116 and the differential gear device 118.

The electric motor 112 may be a permanent magnet type AC motor, an induction motor, a synchronous motor, or a DC motor. The electric motor 112 is accommodated in an enclosed space defined by the cylindrical housing 130 and the first side and intermediate housings 132, 134 which close the respective opposite open ends of the cylindrical housing 130. The electric motor 112 has a stator 136 with a coil winding, which is fixed to the inner circumferential surface of the cylindrical housing 130, and a rotor 140 which is fixed to the drive shaft 114 of the electric motor 112. The drive shaft 114 is rotatably supported by the first side and intermediate housings 132, 134 via a pair of bearings 138L, 138R.

The transmission 116 and the differential gear device 118 are accommodated in an enclosed space defined by the second side and intermediate housings 133, 135. As shown in FIG. 2, the transmission 116 includes a first planetary gear set 142 and a second planetary gear set 144. The first planetary gear set 142 includes a sun gear 142S connected to an end of the drive shaft 114, a carrier 142C, and a planetary gear 142P which is rotatably supported by the carrier 142C and which meshes with the sun gear 142S. The second planetary gear set 144 includes a planetary gear 144P formed integrally with the planetary gear 142P, and a ring gear 144R which is fixed to the second side housing 133 and which meshes with the planetary gear 144P. The speed of the rotary motion of the electric motor 112 which is transferred to the sun gear 142S is reduced by the transmission 116, and the output of the transmission 116 is transferred from the carrier 142C to the differential gear device 118.

The differential gear device 118 is a double-pinion type planetary gear mechanism, which includes: a sun gear 146S connected to the first right constant velocity universal joint 120R; a ring gear 146R connected to the above-indicated carrier 142C; a plurality of planetary gears 146P1, 146P2 which mesh with the sun gear 145S and the ring gear 146R; and a carrier 146C which rotatably supports the planetary gears 146P1, 146P2 and which is connected to the inner shaft 128. The differential gear device 118 is adapted to distribute the drive force received by the ring gear 146R, to the carrier 146C operatively connected to the left drive wheel 126L, and the sun gear 146S operatively connected to the right drive wheel 126R.

Figure 4:
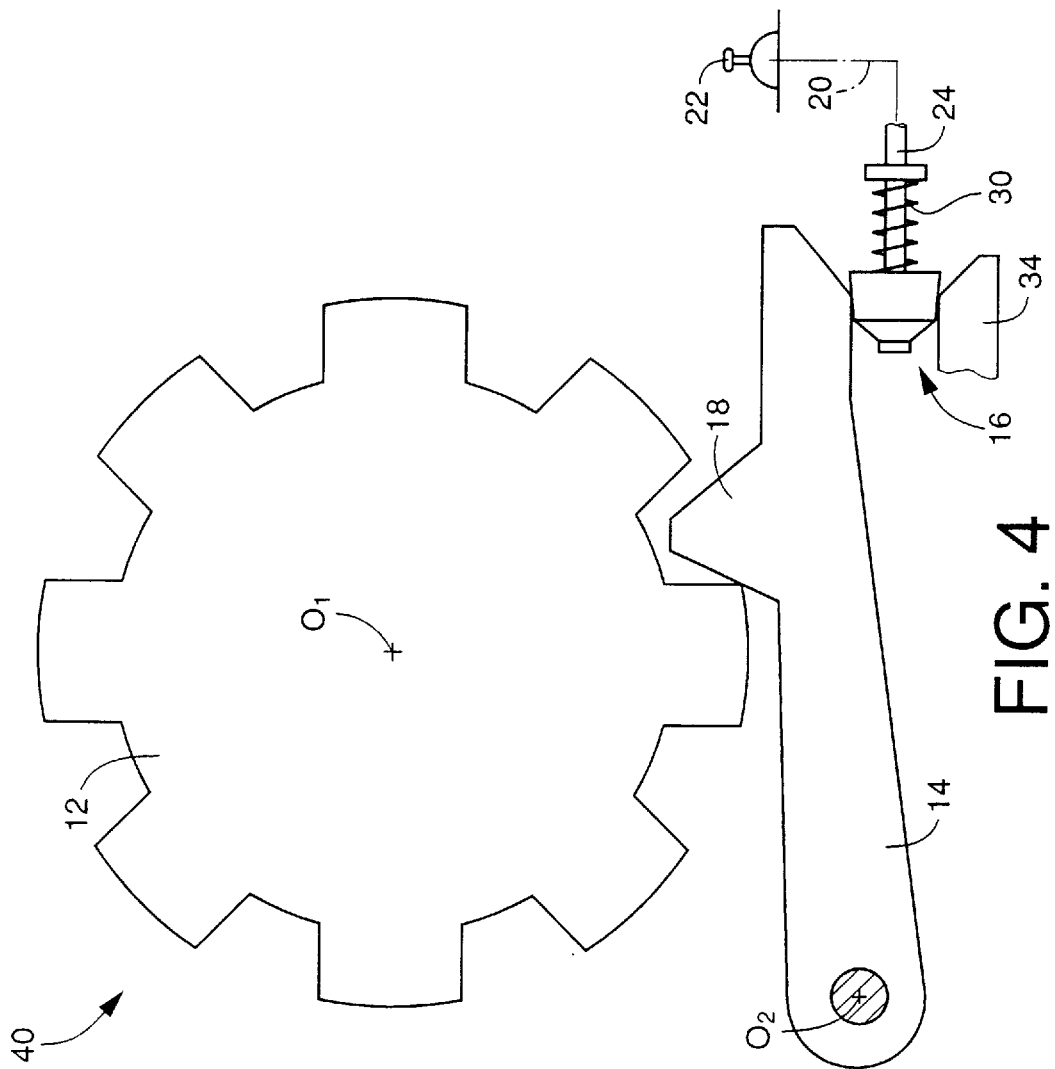
FIG. 4 is a view illustrating a general arrangement of a mechanical parking lock device provided on the electric vehicle with the power train of FIG. 1.

The electric vehicle equipped with the power train 110 described above is provided with a mechanical parking lock device 40 shown in FIG. 4. This mechanical parking lock device 40 is substantially identical with the mechanical parking lock device 10 shown in FIGS. 23A and 23B. In the interest of brevity and simplification, same reference numerals as used in FIGS. 23A and 23B are used in FIG. 4, to identify the corresponding components, and redundant description of these components will not be provided herein. It is noted, however, that the direction of movement of the engaging member 16 and the rod 24 is different from that in the parking lock device 10. In the parking lock device 40 of FIG. 4, an operation of the shift lever 22 to the parking position will cause the rod 24 and engaging member 16 to be linearly moved in a direction perpendicular to the axes 01, 02, that is, in the left direction as seen in FIG. 4, whereby the lock pawl 14 is pivoted to the lock position, while on the other hand, an operation of the shift lever 22 from the parking position to another position will cause the rod 24 and engaging member 16 to be linearly moved in the right direction, whereby the lock pawl 14 is permitted to be pivoted to the unlock position.

As is apparent from FIG. 1, the parking lock gear 12 is disposed in a space between the first and second intermediate housings 134, 135, and is splined to the drive shaft 114 of the electric motor 112 which is mechanically connected to the left and right drive wheels 126L, 126R through the transmission 116 and the differential gear device 118. In this arrangement, the lock gear 12 is rotated with the drive shaft 114, and is axially slidable on the drive shaft 114. In the space indicated above, a rotary position sensor 42 is also disposed for detecting the rotary or angular position of the drive shaft 114.

Figure 5:
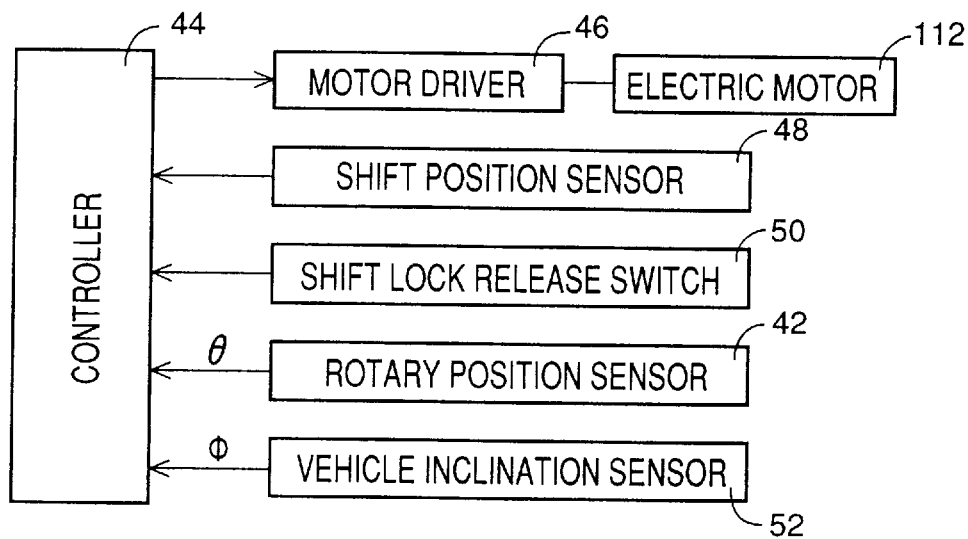
FIG. 5 is a block diagram showing a control system for controlling the mechanical parking lock device of FIG. 4.

In a first embodiment of this invention, the mechanical parking lock device 40 is controlled by a control system as shown in the block diagram of FIG. 5. The control system includes a controller 44 adapted to control the electric motor 112 through a motor driver 46 such that the electric motor 112 is operated in a selected one of the forward and reverse directions. The controller 44 is further adapted to receive output signals of a shift position sensor 48, a shift lock release switch 50, the above-indicated rotary position sensor 42, and a vehicle inclination sensor 52. The output signal of the shift position sensor 48 represents a currently selected one of a plurality of operating positions of the shift lever 22, which includes a parking position "P", a reverse position "R", a neutral position "N", and a forward drive position "D". The output signal of the shift lock release switch 50 indicates whether a SHIFT LOCK RELEASE pushbutton provided on the shift lever 22 is in a depressed state or not. The SHIFT LOCK RELEASE pushbutton should be depressed when the shift lever 22 is operated from the parking position "P" to another position, usually, reverse position "R". With the SHIFT LOCK RELEASE pushbutton placed in a non-depressed state, the shift lever 22 cannot be operated from the parking position "P". The shift lock release switch 50 is ON and OFF when the pushbutton is in the depressed and non-depressed states, respectively. The output signal of the rotary position sensor 42 represents a rotary position $\theta$ of the parking lock gear 12. The output signal of the vehicle inclination sensor 52 represents an inclination angle $\Phi$ of the electric vehicle in a plane parallel to the longitudinal direction of the vehicle. The inclination sensor 52 functions as load detecting means for detecting a load of engagement between the lock gear 12 and the lock pawl 14. The inclination sensor 52 may be disposed at a desired position of the vehicle. A longitudinal load acting on the vehicle in the longitudinal direction when the vehicle is parked on a slope is expressed as $W\sin\Phi$, where W represents the weight of the total vehicle. The load of engagement represented by Fpp is proportional to the longitudinal load $W\sin\Phi$.

The controller 44 is constituted principally by a microcomputer incorporating a central processing unit (CPU), a random-access memory (RAM), and a read-only memory (ROM). The CPU performs signal processing operations according to control programs stored in the ROM. The control programs include a program for controlling the output torque of the electric motor 112 during running of the vehicle, and a program for executing a parking release load reduction control routine illustrated in the flow chart of FIG. 6, to reduce the required operating force of the shift lever 22 when the shift lever 22 is operated from the parking position "P" to another position while the vehicle is parked.

Figure 6:
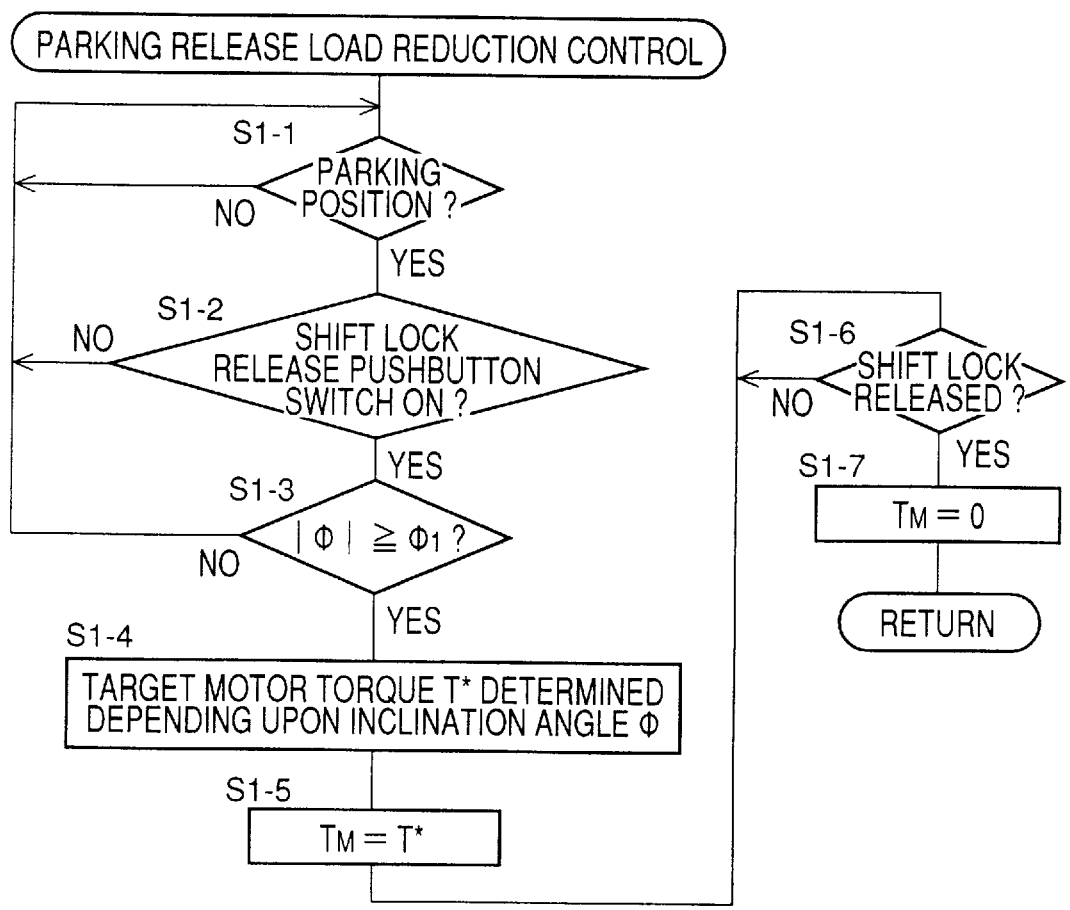
FIG. 6 is a flow chart illustrating a parking release load reduction control routine for reducing a load of engagement between lock gear and pawl of the mechanical parking lock device, according to a first embodiment of this invention.

The parking release load reduction control routine of FIG. 6 is initiated with step S1-1 to determine whether the shift lever 22 is currently placed in the parking position "P". This determination is effected on the basis of the output signal of the shift position sensor 48. If an affirmative decision (YES) is obtained in step S1-1, the control flow goes to step S1-2 to determine whether the SHIFT LOCK RELEASE pushbutton in in the depressed state. This determination is effected on the basis of the output signal of the shift lock switch 50. When the shift lever 22 is placed in the parking position "P" while the SHIFT LOCK RELEASE pushbutton is in the depressed state, it means that the operator of the electric vehicle is in the process, or has an intention of operating the shift lever 22 from the parking position "P" to another position.

It will be understood that the shift position sensor 48, the shift lock release switch 50 and a portion of the controller 44 assigned to implement steps S1-1 and S1-2 cooperate to constitute parking release intention determining means for determining whether the vehicle operator has an intention of operating the shift lever from the parking position "P" to another position.

Figure 7:
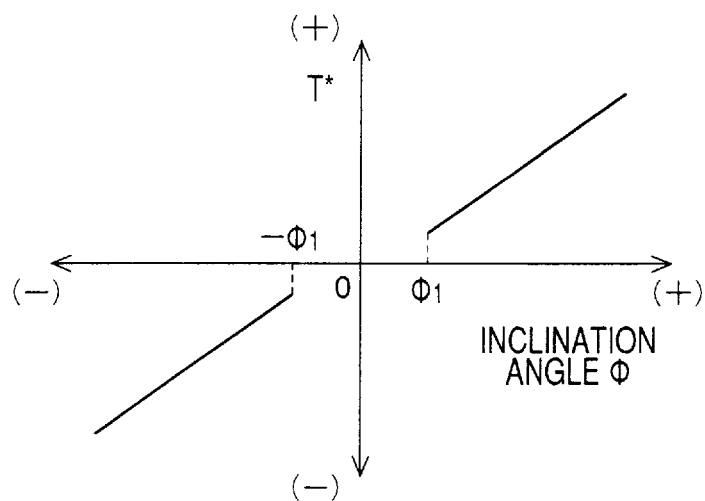
FIG. 7 is a graph indicating a relationship between an inclination angle $\Phi$ of the vehicle and a target motor torque T*, which relationship is used in step S1-4 of the routine of FIG. 6.

When an affirmative decision (YES) is obtained in both steps S1-1 and S1-2, the control flow goes to step S1-3 to determine whether an absolute value '$\Phi$' of the inclination angle $\Phi$ of the vehicle detected by the vehicle inclination sensor 52 is equal to or larger than a predetermined threshold $\Phi1$. If an affirmative decision (YES) is obtained, the control flow goes to step S1-4. The threshold $\Phi1$ is an upper limit of the inclination angle $\Phi$ above which the force required to operate the shift lever 22 from the parking position "P" to another position is considerably large unexpectedly to the vehicle operator, due to the inclination of the vehicle being parked. In step S1-4, a target value T* of a torque $T_M$ of the electric motor 112 is determined on the basis of the detected inclination angle $\Phi$ and according to a predetermined relationship between the detected inclination angle $\Phi$ and the target motor torque value T*. This relationship is represented by a data map or formula stored in the ROM. S1-4 is followed by step S1-5 in which the electric motor 112 is activated and controlled such that the motor torque $T_M$ coincides with the target value T*. For instance, the above-indicated relationship is determined as indicated in the graph of FIG. 7, so that the target motor torque T* is determined depending upon the vehicle inclination angle Φ, so as to substantially zero the load of engagement Fpp. Since the engagement load Fpp varies with changes in the number of passengers on the vehicle and the vehicle weight W, the relationship of FIG. 7 is desirably formulated based on the maximum vehicle load (passenger load with nominal maximum number of passengers+nominal maximum cargo load). In the relationship of FIG. 7, the vehicle inclination angle Φ is positive (+) when the vehicle is on an uphill, namely, when the front end of the vehicle is higher than the rear end, and the desired motor torque T* is positive (+) when the electric motor 112 is rotated in a direction for driving the vehicle in the forward direction.

It will be understood that a portion of the controller 44 assigned to implement steps S1-4 and S1-5 constitutes parking release motor control means for activating the electric motor 112 so as to reduce the engagement load Fpp.

Step S1-5 is followed by step S1-6 to determine whether the shift lever 22 has been operated from the parking position "P" to another position, that is, whether the locking of the drive wheels 126L, 126R by the mechanical parking lock device 40 is released. This determination may be effected on the basis of the output signal of the shift position sensor 48, that is, by determining whether the position of the shift lever 22 other than the parking position "N" is selected. However, the determination in step S1-6 may be effected on the basis of any other suitable detector, such as a rotary position sensor or limit switch adapted to detect a rotary motion of the lock pawl 14 to the unlock position, for example. If an affirmative decision (YES) is obtained in step S1-6, the control flow goes to step S1-7 in which the motor torque $T_M$ is zeroed.

Thus, the control system of FIG. 4 used in the present first embodiment is adapted to activate the electric motor 112 so as to substantially zero the engagement load Fpp between the lock gear 12 and the lock pawl 14 of the parking lock device 40, when the shift lever 22 is operated by the vehicle operator from the parking position "P" to another position. Accordingly, the required operating force of the shift lever 22 upon releasing of the parking lock of the drive wheels 126L, 126R is significantly reduced even when a considerably large longitudinal load acts on the vehicle parked on a steep slope, whereby the shift lever 22 can be operated as easily as on a flat road surface. Since the electric motor 112 which is provided as the vehicle drive power source is utilized for facilitating the operation of the shift lever 22, the present apparatus for controlling the parking lock device 40 is available at a relatively low cost, without a considerable change of design of the vehicle.

Further, the output torque of the electric motor 112 is controlled depending upon the vehicle inclination angle Φ detected by the vehicle inclination sensor 52, so as to substantially zero the engagement load Fpp, so that the required operating force of the shift lever 22 upon releasing of the shift lock of the drive wheels can be effectively and efficiently reduced with high stability. In addition, the vehicle inclination sensor 52 can be disposed at any desired position on the vehicle, without a particular limitation.

Where the absolute value 'Φ' of the inclination angle Φ is smaller than the threshold Φ1, that is, when the required operating force of the shift lever 22 is comparatively small as in the case of parking of the vehicle on a flat road surface, steps S1-4 through S1-7 will not be implemented, namely, the electric motor 112 is not activated for facilitating the operation of the shift lever 22 from the parking position "P" to another position, whereby unnecessary power consumption by the electric motor 112 is avoided.

Referring next to the flow chart of FIG. 8, there will be described a parking release load reduction control routine according to a second embodiment of this invention.

Figure 8:
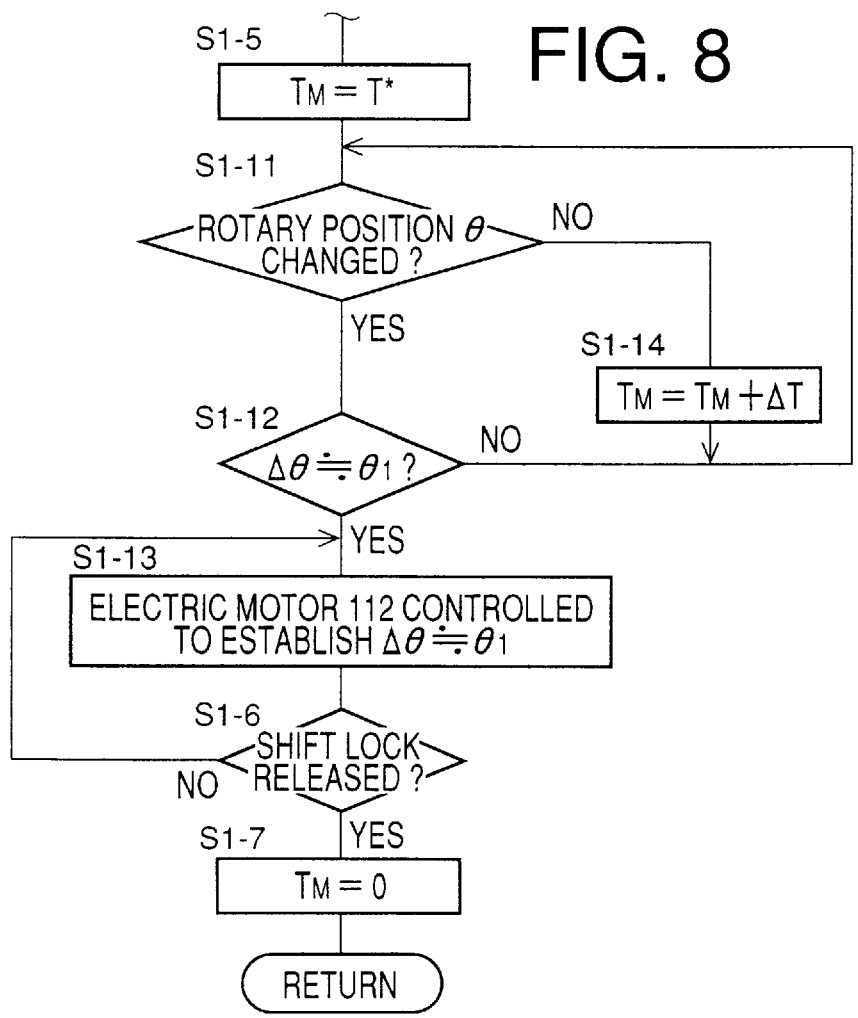
FIG. 8 is a flow chart illustrating a parking release load reduction control routine according to a second embodiment of this invention.

The routine of FIG. 8 includes steps S1-11 through S1-14, which are inserted between steps S1-5 and S1-6 of the routine of FIG. 6 according to the first embodiment. Step S1-11 is provided to determine whether the rotary position θ of the lock gear 12 as detected by the rotary position sensor 42 has changed, that is, whether the lock gear 12 has been rotated by the electric motor 112, and disengaged from the lock pawl 14. If a negative decision (NO) is obtained in step S1-11, the control flow goes to step S1-14 in which the motor torque $T_M$ is increased by a predetermined increment ΔT, and the control flow returns to step S1-14. Steps S1-14 and S1-14 are repeatedly implemented until an affirmative decision (YES) is obtained in step S1-11.

If the affirmative decision (YES) is obtained in step S1-11, namely, if the rotary position θ of the lock gear 12 has changed, the control flow goes to to step S1-12 to determine whether the angle of rotation Δθ of the lock gear 12 has increased to a predetermined desired θ1. Steps S1-11 and S1-12 are repeatedly implemented until an affirmative decision (YES) is obtained in step S1-12. If the affirmative decision (YES) is obtained in step S1-12, that is, when the angle of rotation Δθ has become substantially equal to the desired value θ1, the control flow goes to step S1-13 in which the rotary position of the electric motor 112 is controlled so that the angle of rotation Δθ is substantially equal to the desired value θ1. This control of the electric motor 112 is effected by controlling the motor torque $T_M$ in a feedback fashion so that the angle of rotation Δθ being read coincides with the desired value θ1.

Figure 9:
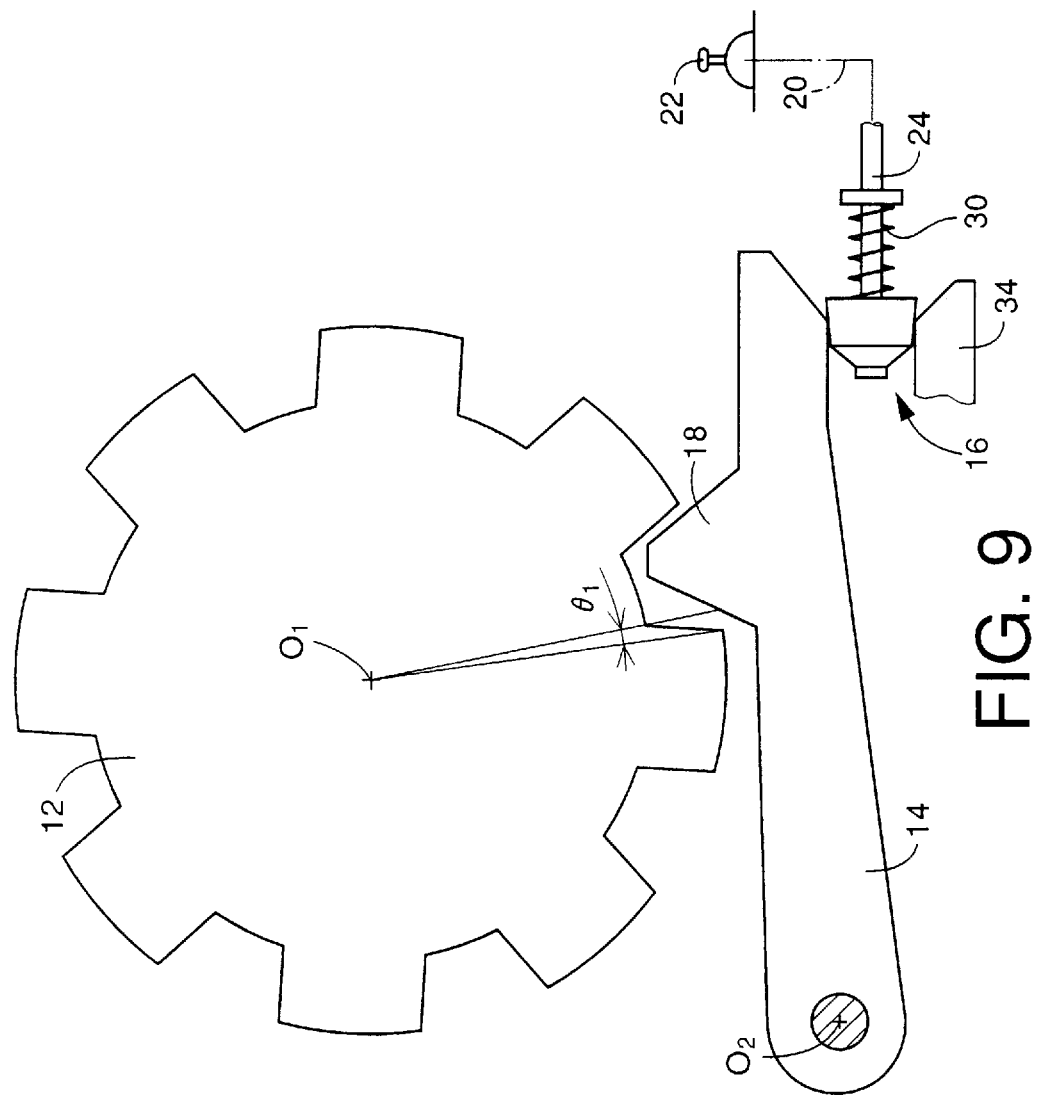
FIG. 9 is a view for explaining a rotation angle θ1 of the lock gear required for disengagement thereof from the lock pawl, which angle is used in the second embodiment of FIG. 8.

The angle of rotation Δθ is an angle of rotation of the lock gear 12 from the rotary position in which the lock gear 12 engages the lock pawl 14, to a rotary position in which the lock gear 12 is disengaged from the tooth 18 of the lock pawl 14, as shown in FIG. 9, namely, to a rotary position in which the engagement load Fpp is zero. The desired value θ1 is determined by the specifications of the lock gear 12 and the tooth 18. For instance, the desired value θ1 is determined to be a half of an angle of play θE of the lock gear 12 with respect to the tooth 18 of the lock pawl 14.

It will be understood that a portion of the controller 44 assigned to implement steps S1-11 through S1-14 constitutes rotary position control means for controlling the rotary position of the electric motor 112 on the basis of the detected rotary position of the parking lock gear 12, such that the parking lock gear 12 and the parking lock pawl 14 are held in a relative position in which the engagement load Fpp is substantially zero. The above-indicated parking release motor control means includes this rotary position control means.

In the present second embodiment, the lock gear 12 is held in a suitable position relative to the lock pawl 14, so that the engagement load Fpp is zeroed, irrespective of a change in the vehicle weight W, for example. Accordingly, the required operating force of the shift lever 22 is always reduced to a value as in the case of parking of the vehicle on a flat road surface. Further, the torque $T_M$ of the electric motor 112 required to position the lock gear 12 is minimized for reduced electric energy consumption.

Figure 10:
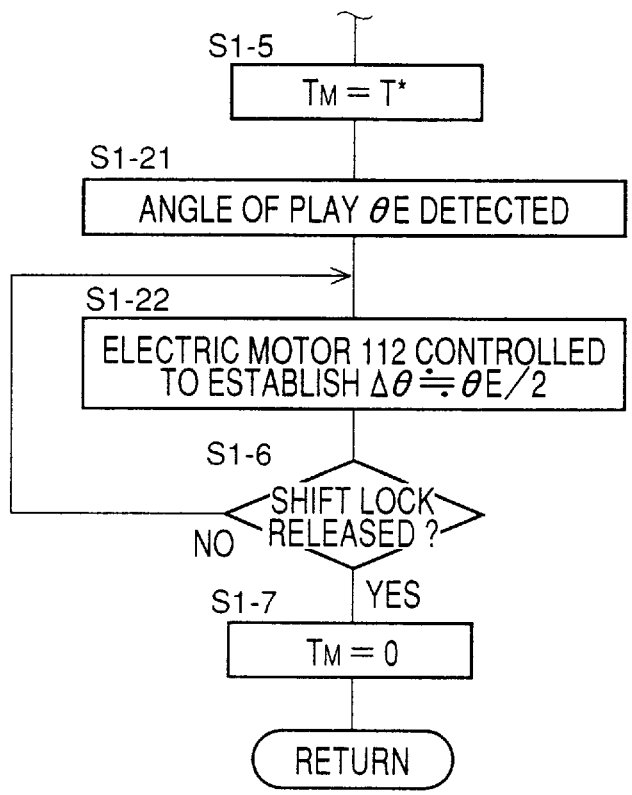
FIG. 10 is a flow chart illustrating a parking release load reduction control routine according to a third embodiment of the invention.

Referring to the flow chart of FIG. 10, there is shown a parking release load reduction control routine according to a third embodiment of this invention.

The routine of FIG. 10 includes steps S1-21 and S1-22 inserted between steps S1-5 and S1-6 of the routine of FIG. 6. Step S1-21 is provided to detect an angle of play θE of the lock gear 12 with respect to the lock pawl 14. The angle of play θE can be detected by activating the electric motor 112 to rotate the lock gear 12 until the tooth of the lock gear 12 next to the tooth initially contacting one of two inclined surfaces of the tooth 18 of the lock pawl 14 is brought into contact with the other inclined surface of the tooth 18. Step S1-21 is followed by step S1-22 in which the rotary position of the electric motor 112 is controlled so that the angle of rotation Δθ of the lock gear 12 from the initial position contacting the tooth 18 is substantially equal to θE/2, for example. The angle of rotation Wr substantially equal to θE/2 causes the lock gear 12 to be disengaged from the lock pawl 14. In step S1-22, the electric motor 112 is operated to produce the desired torque T*. If the rotary position θ of the lock gear 12 is not changed in step S1-22, the torque $T_M$ of the electric motor 112 is increased by a suitable amount, and the electric motor 112 is operated again, as in the routine of FIG. 8.

The present third embodiment provides substantially the same advantage as the second embodiment of FIG. 8. In the third embodiment, a portion of the controller 44 assigned to implement to steps S1-21 and S1-22 constitutes the rotary position control means of the parking release motor control means.

Figure 11:
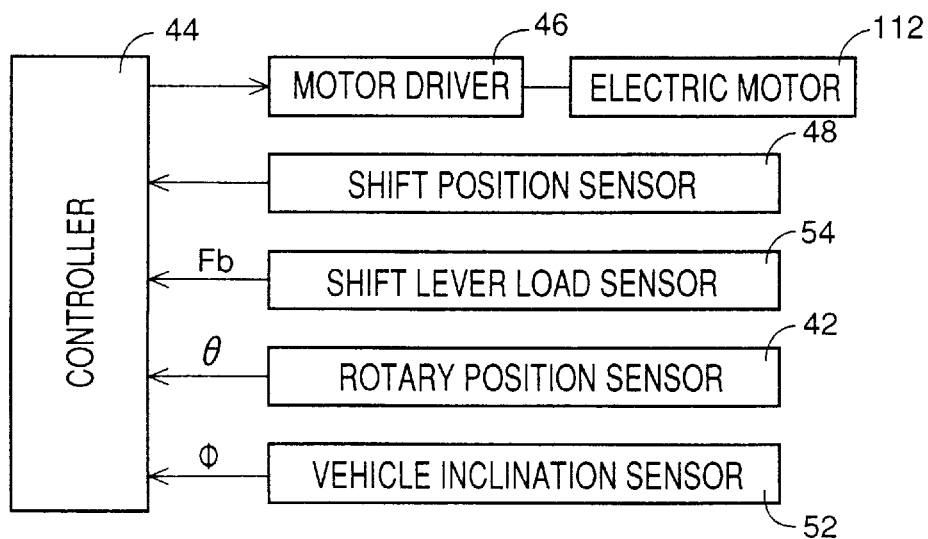
FIG. 11 is a block diagram showing a control system for the mechanical parking lock device, according to a fourth embodiment of the invention.
Figure 12:
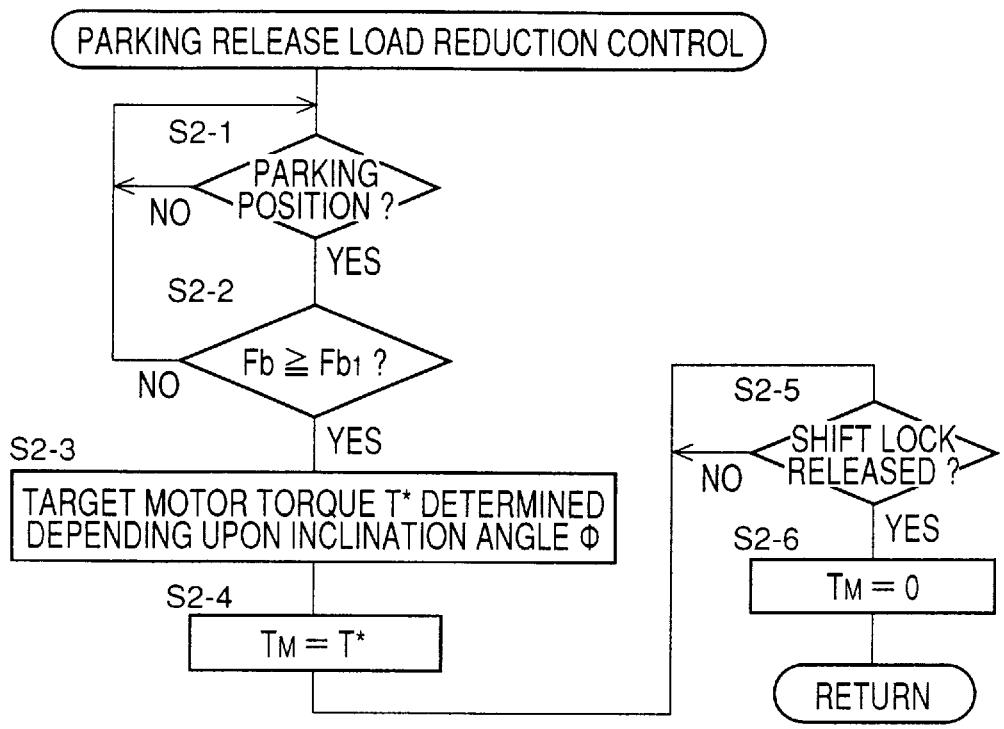
FIG. 12 is a flow chart illustrating a parking release load reduction control routine in the fourth embodiment of FIG. 11.

Referring to FIGS. 11 and 12, there will be described a fourth embodiment of this invention, wherein the control system uses load detecting means in the form of a shift lever load sensor 54 such as a strain gage, in place of the shift lock release switch 50 used in the first, second and third embodiments. The shift lever load sensor 54 is adapted to detect a load Fb acting on the shift lever 22 (hereinafter referred to as "shift lever load") when the shift lever 22 is operated from the parking position "P" to another position. The shift lever load sensor 54 is disposed in a linkage between the shift lever 22 and the engaging member 16. In the present fourth embodiment, a parking release load reduction control routine illustrated in the flow chart of FIG. 12 is executed.

The routine of FIG. 12 includes steps S2-1 and S2-3 through S2-6, which are identical with steps S1-1 and S1-4 through S1-7 of the routine of FIG. 6, respectively. If an affirmative decision (YES) is obtained in step S2-1, the control flow goes to step S2-2 to determine whether the shift lever load Fb detected by the shift lever load sensor 54 is equal to or larger than a predetermined threshold Fb1. If an affirmative decision (YES) is obtained in step S2-2, the control flow goes to step S2-3 and the following steps. The threshold Fb1 is an upper limit of the shift lever load Fb above which the force required to operate the shift lever 22 from the parking position "P" to another position is considerably large unexpectedly to the vehicle operator, due to the inclination of the vehicle being parked.

It will be understood that the shift position sensor 48, the load sensor 54 and a portion of the controller 44 assigned to implement steps S2-1 and S2-2 constitute the parking release load determining means for determining whether the shift lever load upon operation thereof from the parking position "P" to another position is larger than a predetermined threshold. It will also be understood that a portion of the controller assigned to implement steps S2-3 and S2-4 constitutes the parking release motor control means.

In the present fourth embodiment, steps S2-3 through S2-6 are not implemented when the shift lever load Fb is smaller than the threshold value Fb1, that is, the electric motor 112 is not activated, so that unnecessary electric power consumption by the electric motor 112 is avoided. The present arrangement is substantially the same as the arrangement in the preceding embodiments in which the electric motor 112 is not activated when the absolute value 'Φ' of the vehicle inclination angle Φ is smaller than the threshold value Φ1. In the present fourth embodiment, however, the load Fb acting on the shift lever 22 is directly detected by the load sensor 54, whereby the shift lever load Fb can be reduced below the threshold value Fb1 with high stability, irrespective of chronological changes of the various parts of the electric vehicle and differences of the individual electric vehicles. It is noted that the present fourth embodiment may incorporates the features of the second third embodiments of FIGS. 8 and 10.

A fifth embodiment of the invention will be described by reference to FIGS. 13 and 14. The control system of this embodiment uses a longitudinal load sensor 56 such as a strain gage, in place of the vehicle inclination sensor 52 used in the first, second and third embodiments. The longitudinal load sensor 56 is adapted to detect, as the engagement load Fpp, a longitudinal load Fa which acts on the electric vehicle in the longitudinal direction due to the gradient of the road surface. The sensor 56 functions as load detecting means for detecting the engagement load Fpp.

The sensor 56 may be a strain gage which is attached to the tooth 18 of the lock pawl 14, to directly detect the engagement load Fpp between the lock gear 12 and the lock pawl 14. However, the sensor 56 may be disposed at any other position in a load transmitting path between the drive wheel 126L, 126R and the lock pawl 14, or attached to the engaging member 16 engageable with the lock pawl 14, or to the support member 34 for backing up the engaging member 16. The encagement load Fpp is proportional to the longitudinal load Fa.

Figure 14:
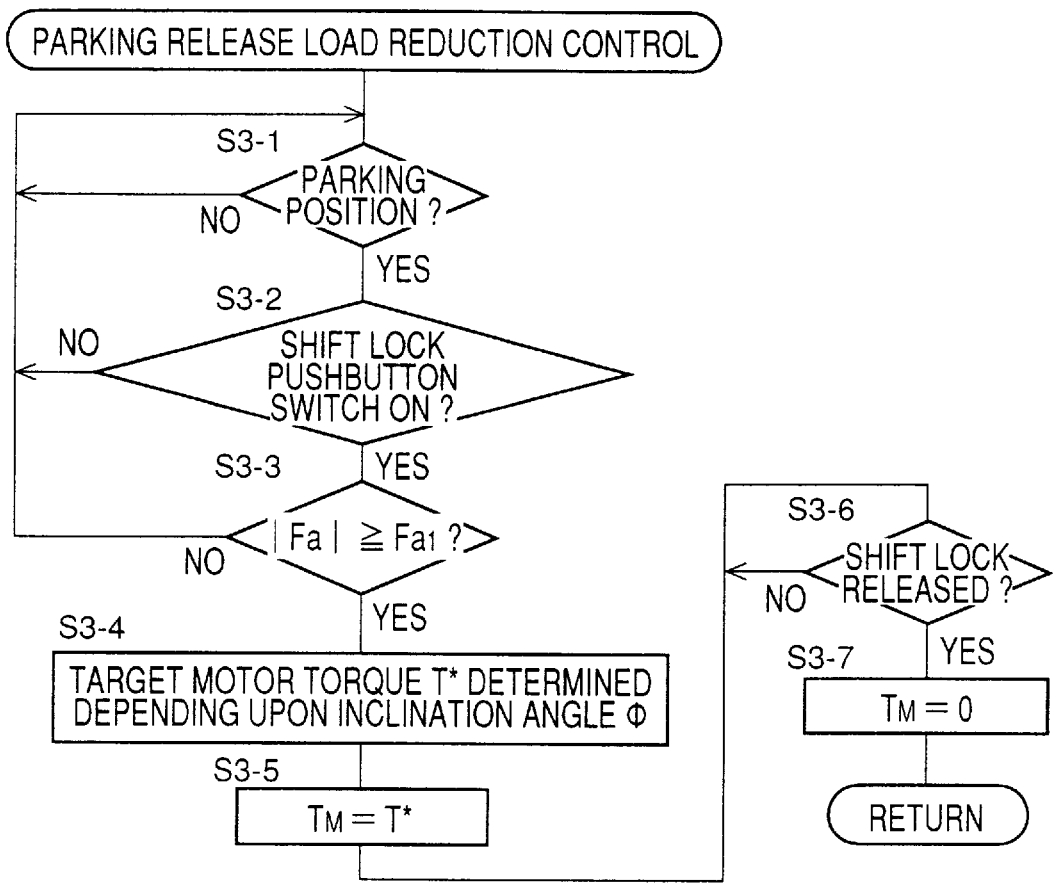
FIG. 14 is a flow chart illustrating a parking release load reduction control routine in the fifth embodiment of FIG. 13.
Figure 15:
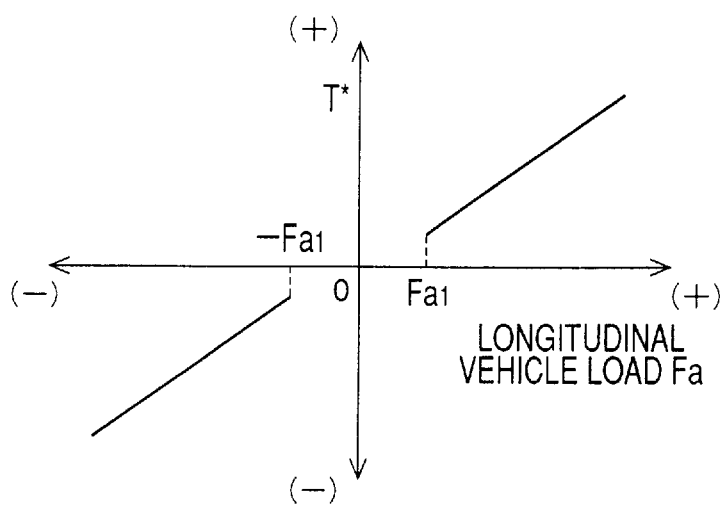
FIG. 15 is a graph indicating a relationship between a longitudinal vehicle load Fa and a target motor torque T*, which relationship is used in step S3-4 of the routine of FIG. 14.

The controller 44 of the control system of the present fifth embodiment is adapted to execute a parking release load reduction control routine illustrated in the flow chart of FIG. 14. This routine includes steps S3-1, S3-2 and S3-5 through S3-7, which are identical with steps S1-1, S1-2 and S1-5 through S1-7 of FIG. 6, respectively. If an affirmative decision (YES) is obtained in step S3-2, the control flow goes to step S3-3 to determine whether an absolute value 'Fa' of the longitudinal load Fa detected by the longitudinal load sensor 56 is equal to or larger than a predetermined threshold Fa1. If an affirmative decision (YES) is obtained in step S3-3, the control flow goes to step S3-4 and the subsequent steps. The threshold value FA1 is an upper limit of the longitudinal load Fa above which the force required to operate the shift lever 22 from the parking position "P" to another position is considerably large unexpectedly to the vehicle operator, due to the inclination of the vehicle being parked. Where the electric vehicle uses a friction type or other parking brake in addition to the mechanical parking lock device 40, the longitudinal load Fa is preferably detected after the parking brake is released. In step S3-4, the desired motor torque T* is determined on the basis of the detected longitudinal load Fa and according to a predetermined relationship between the target value T* and the load Fa. This relationship may be represented by a stored data map or formula. For example, the relationship is determined as indicated in the graph of FIG. 15, so that the desired motor torque T8 is determined depending upon the longitudinal vehicle load Fa, so as to substantially zero the engagement load Fpp. In the relationship of FIG. 15, the longitudinal vehicle load Fa is positive (+) when the load Fa acts on the vehicle in the rearward direction, namely, when the vehicle is parked on an uphill, and the desired motor torque T* is positive (+) when the electric motor 112 is rotated in a direction for driving the vehicle in the forward direction.

Figure 13:
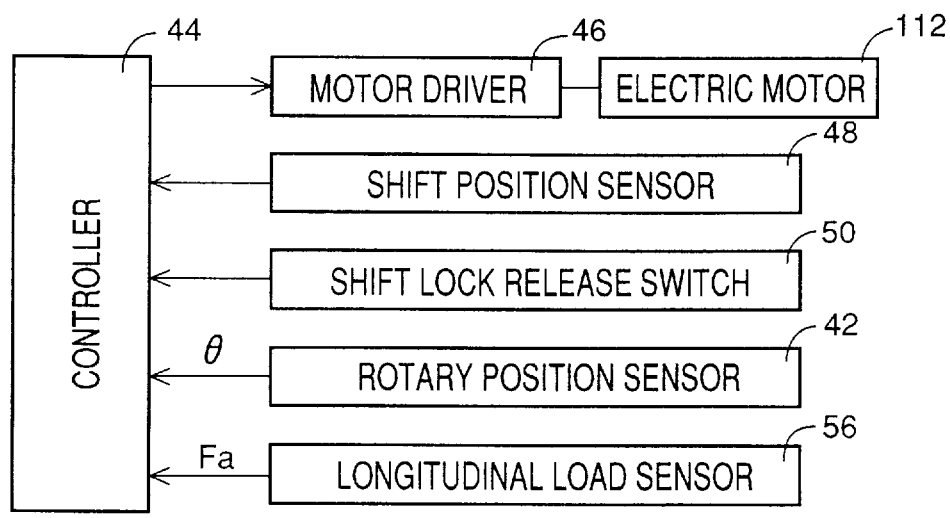
FIG. 13 is a block diagram showing a control system for the mechanical parking lock device, according to a fifth embodiment of the invention.

In the present fifth embodiment of FIGS. 13 and 14 wherein the longitudinal vehicle load Fa is detected as the engagement load Fpp, the detected engagement load Fpp is not influenced by the cargo load and/or the number of passengers of the vehicle, and the accuracy of detection of the engagement load Fpp is made higher than that in the preceding embodiments using the vehicle inclination sensor 52. Accordingly, the required operating force of the shift lever 22 upon releasing of the parking lock can be effectively reduced with higher stability. It is noted that the present fifth embodiment may incorporates the features of the second and third embodiments of FIGS. 8 and 10. Further, the fifth embodiment may use the shift lever load sensor 54 as in the fourth embodiment of FIGS. 11 and 12, to determine whether the vehicle operator has an intention of operating the shift lever 22 from the parking position "P" to another position.

Referring next to the flow chart of FIG. 16, there will be described a sixth embodiment of the invention, which is a modification of the fifth embodiment of FIGS. 13 and 14. That is, the sixth embodiment has the longitudinal load sensor 56 which is not disposed in a linkage between the electric motor 112 and the drive wheel 126L, 126R. For instance, the longitudinal load sensor 56 is disposed on the lock pawl 14 or engaging member 16. The sixth embodiment is adapted to control the electric motor 112 so that the longitudinal vehicle load Fa detected by the longitudinal load sensor 56 is substantially zeroed, according to a parking release load reduction control routine illustrated in the flow chart of FIG. 14. The routine of FIG. 14 includes steps S3-11, S3-12 and S3-13 inserted between steps S3-5 and S3-6. Step S3-11 which follows step S3-5 is provided to determine whether the longitudinal load Fa is substantially zeroed, that is, whether the lock gear 12 has been rotated by the electric motor 112 and disengaged from the lock pawl 14. If a negative decision (NO) is obtained in step S3-11, the control flow goes to step S3-13 in which the motor torque $T_M$ is increased by a predetermined increment $\Delta T$. Steps S3-11 and S3-13 are repeatedly implemented until an affirmative decision (YES) is obtained in step S3-11. When the affirmative decision (YES) is obtained in step S3-11, the control flow goes to step S3-13 in which the electric motor 112 is controlled so that the longitudinal load Fa is substantially zeroed.

Figure 16:
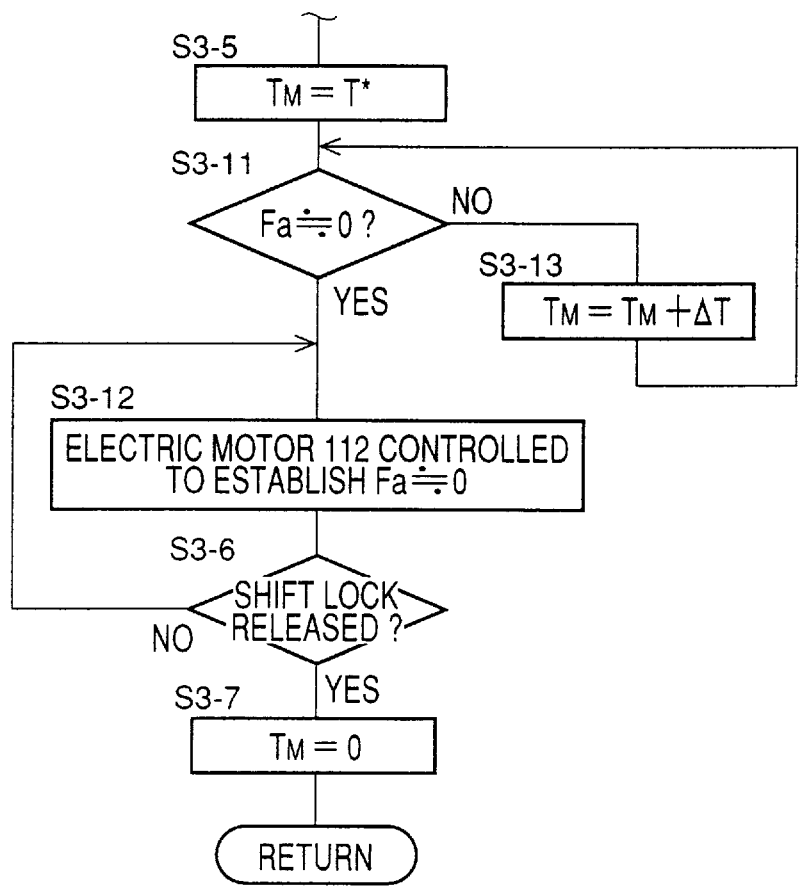
FIG. 16 is a flow chart illustrating a parking release load reduction control routine according to a sixth embodiment of the invention.

Like the second and third embodiments of FIGS. 8 and 10, the present sixth embodiment of FIG. 16 is adapted to hold the lock gear 12 in the position in which the engagement load Fpp is substantially zero with the lock gear 12 being disengaged from the lock pawl 14. Accordingly, the force required for operating the shift lever 22 from the parking position "P" to another position during parking of the vehicle on a slope can be reduced to a value which is substantially the same as in the case of parking of the vehicle on a flat road surface. Further, the required motor torque $T_M$ is minimized, and unnecessary electric power consumption by the electric motor 112 is avoided.

Figure 17:
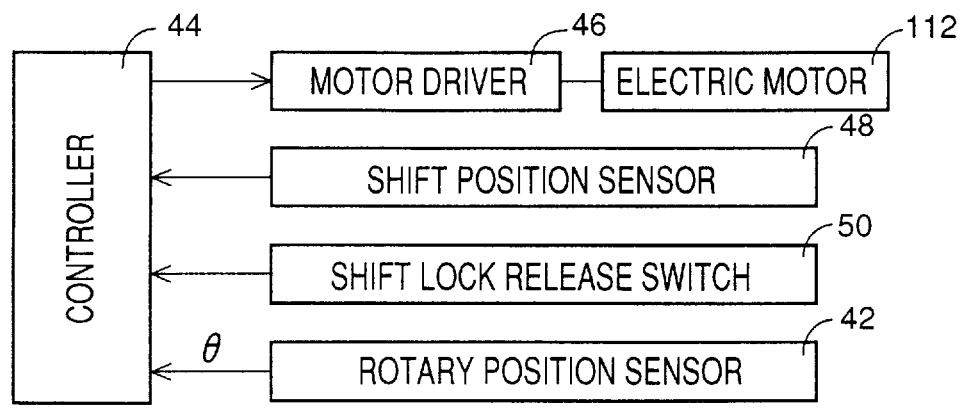
FIG. 17 is a block diagram showing a control system according to a seventh embodiment of the invention.
Figure 18:
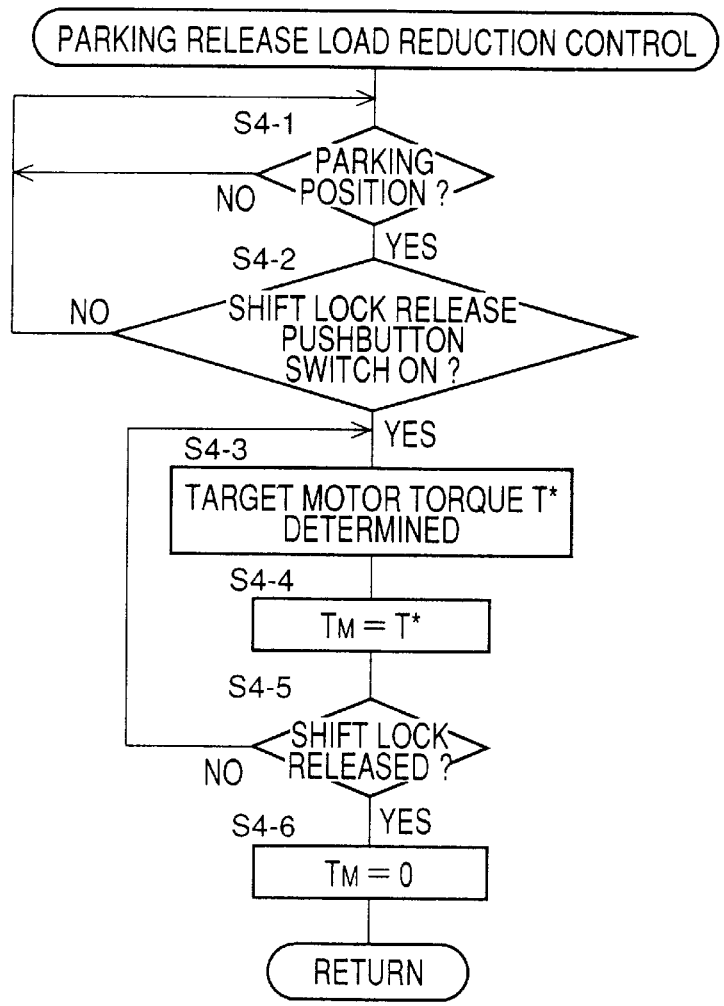
FIG. 18 is a flow chart illustrating a parking release load reduction control routine in the seventh embodiment of FIG. 17.
Figure 19:
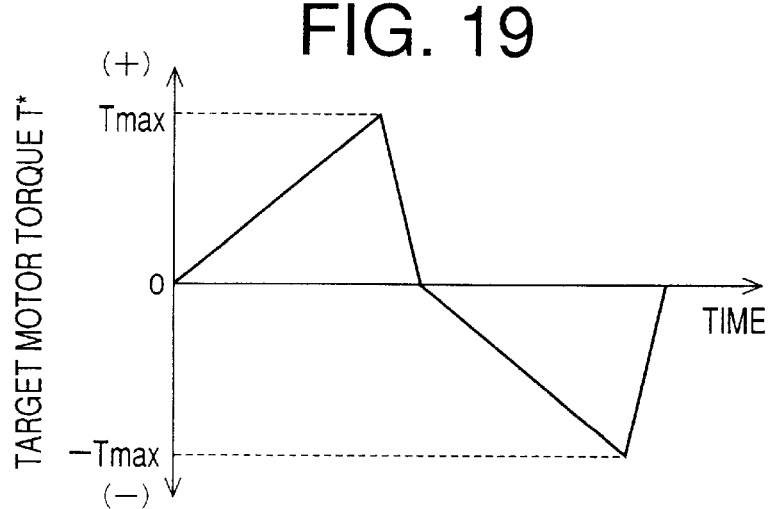
FIG. 19 is a graph indicating a predetermined pattern of change of the target motor torque T* as a function of time, in step S4-3 of the routine of FIG. 18.

Referring next to FIGS. 17–19, there will be described a seventh embodiment of this invention, which does not use the inclination sensor 52, as indicated in FIG. 17. The present embodiment is adapted to execute a parking release load reduction control routine illustrated in the flow chart of FIG. 18, which includes steps S4-1, S4-2 and S4-4 through S4-4 identical with steps S1-1, S1-2 and S1-5 through S1-7 of the first embodiment of FIG. 6. If an affirmative decision (YES) is obtained in step S4-2, the control flow goes to step S4-3 in which the target value T* of the torque $T_M$ of the electric motor 112 is determined such that the magnitude and direction of the target motor torque value T* are changed according to a predetermined pattern, as indicated in FIG. 19 by way of example. In the specific example of FIG. 19, the target value T* is first increased in the positive direction (+) up to a predetermined maximum value Tmax at a predetermined rate, and is then decreased in the negative direction (−) down to a predetermined minimum value −Tmin at a predetermined rate. In step S4-4, the electric motor 112 is controlled so that motor torque $T_M$ coincides with the determined target value T*. Steps S4-3 and S4-4 are repeatedly implemented until an affirmative decision (YES) is obtained in step S4-5.

It will be understood that a portion of the controller 44 assigned to implement steps S4-1 and S4-2 constitutes the parking release intention determining means, while a portion of the controller 44 assigned to implement steps S4-3 and S4-4 constitutes the parking release motor control means.

The present seventh embodiment does not require means for obtaining or detecting the magnitude and direction of the load of engagement Fpp of the lock gear 12 and lock pawl 14, since the engagement load Fpp is reduced in the process of a change of the motor torque $T_M$ as a result of a change of the target value t* according to the predetermined pattern as indicated in FIG. 19, whereby the required operating force of the shift lever 22 upon operation thereof from the parking position "P" is reduced. The present embodiment is relatively simple in construction and is available at a reduced cost without the use of the inclination sensor 52 or load sensor 56.

A parking release load reduction control routine illustrated in the flow chart of FIG. 20 according to an eighth embodiment of the invention is a modification of the routine of FIG. 18. In the routine of FIG. 20, step S4-4 is followed by step S4-11 to determine the rotary position e of the lock gear 12 as detected by the rotary position sensor 42 has changed. If a negative decision (NO) is obtained in step S4-11, the control flow goes back to step S4-3. Steps S4-3, S4-4 and S4-11 are repeatedly implemented until an affirmative decision (YES) is obtained in step S4-11. When the affirmative decision (YES) is obtained in step S4-11, the control flow goes to step S4-12 to determine whether the angle of rotation $\Delta\theta$ of the lock gear 12 has increased to a predetermined desired $\theta 1$. Steps S4-3 through S4-12 are repeatedly implemented until an affirmative decision (YES) is obtained in step S4-12. If the affirmative decision (YES) is obtained in step S4-12, the control flow goes to step S4-13 in which the rotary position of the electric motor 112 is controlled so that the angle of rotation $\Delta\theta$ is substantially equal to the desired value $\theta 1$.

It will be understood that a portion of the controller 44 assigned to implement steps S4-11 through S1-13 constitutes rotary position control means for controlling the rotary position of the electric motor 112 on the basis of the detected rotary position of the parking lock gear 12. The above-indicated parking release motor control means includes this rotary position control means.

In the present eighth embodiment, the lock gear 12 is held in a suitable position relative to the lock pawl 14, so that the engagement load Fpp is zeroed. Accordingly, the required operating force of the shift lever 22 is reduced to a value as in the case of parking of the vehicle on a flat road surface. Further, the torque $T_M$ of the electric motor 112 required to position the lock gear 12 is minimized for reduced electric energy consumption.

Referring to the flow chart of FIGS. 21 and 22, there is shown a parking release load reduction control routine according to a ninth embodiment of this invention, wherein the rotary position sensor 42 is adapted to detect the rotary position e of the lock gear 12. The routine of FIG. 21 includes steps S5-1, S5-2, S5-5 and S5-6, which are identical with steps S1-1, S1-2, S1-6 and S1-7 of the routine of FIG. 1. If an affirmative decision (YES) is obtained in step S5-2, the control flow goes to step S5-3 in which a target value $\theta^*$ of the rotary position $\theta$ of the lock gear 12 is determined on the basis of the detected rotary position $\theta$ and according to a predetermined relationship between the target value $\theta^*$ and the detected value $\theta$, as indicated in FIG. 22 by way of example. This relationship may be represented by a stored data map, and is formulated so that the lock gear 12 is disengaged from the lock pawl 14 when the lock gear 12 is positioned at the target rotary position $\theta^*$. The example of the relationship of FIG. 22 is the one where the lock gear has eight teeth.

It will be understood that a portion of the controller 44 assigned to implement steps S5-1 and S5-2 constitutes the parking release intention determining means, while a portion of the controller 44 assigned to implement steps S5-3 and S5-4 constitutes the rotary position control means of the parking release motor control means.

The present ninth embodiment does not require means for obtaining or detecting the magnitude and direction of the engagement load Fpp, since the lock gear 12 is rotated to the position in which the lock gear 12 is disengaged from the lock pawl 14, and the engagement load Fpp is zeroed, whereby the required operating force of the shift lever 22 upon operation thereof from the parking position "P" is reduced. The present embodiment is relatively simple in construction and is available at a reduced cost without the use of the inclination sensor 52 or load sensor 56. The present embodiment may be adapted to use the shift lever load sensor 54 as used in the fourth embodiment of FIGS. 11 and 12, to determine whether the vehicle operator has an intention of operating the shift lever 22 from the parking position "P" to another position.

While the presently preferred embodiments of the present invention have been described above in detail by reference to the accompanying drawings, for illustrative purpose only, it is to be understood that the present invention is not limited to the details of the illustrated embodiments, but may be embodied with various changes, modifications and improvements, which may occur to those skilled in the art, without departing from the spirit and scope of the invention defined in the following claims.

What is claimed is:

1. An apparatus for controlling a mechanical parking lock device of an electric vehicle including an electric motor as a drive power source for driving the electric vehicle, said mechanical parking lock device including (a) a parking lock gear rotated with a wheel of the electric vehicle, (b) a parking lock pawl having a lock position in which said parking lock pawl is engaged with said parking lock gear to lock said wheel, and an unlock position in which said parking lock pawl is disengaged from said parking lock gear, and (c) an engaging member mechanically linked with a shift lever such that said engaging member is engaged with said parking lock pawl to bring said pawl into said lock position when said shift lever is operated to a parking position, and such that said engaging member permits said pawl to be moved to said unlock position when said shift lever is operated from said parking position to another position, said apparatus comprising:

parking release intention determining means for determining whether an operator of the electric vehicle has an intention of operating said shift lever from said parking position to said another position; and parking release motor control means, operable when said parking release intention determining means determines that the operator has said intention, for activating said electric motor so as to reduce a load of engagement between said parking lock gear and said parking lock pawl.

2. An apparatus according to claim 1, wherein said parking release intention determining means comprises parking release load determining means for determining whether a load acting on said shift lever upon operation thereof from said parking position to another position is larger than a predetermined threshold, and wherein said parking release motor control means is activated when said parking release load determining means determines that said load acting on said shift lever is larger than said predetermined threshold.

3. An apparatus according to claim 1, wherein said parking release intention determining means comprises load detecting means for detecting said load of engagement between said parking lock gear and said parking lock pawl, and wherein said parking release motor control means determines a torque and a direction of operation of said electric motor, on the basis of a magnitude and a direction of said load of engagement detected by said load detecting means.

4. An apparatus according to claim 3, wherein said load detecting means comprises a vehicle inclination sensor for detecting an angle of inclination of said electric vehicle in a plane parallel to a longitudinal direction of the electric vehicle.

5. An apparatus according to claim 3, wherein said load detecting means comprises a load sensor for detecting a longitudinal load which acts on the electric vehicle in a longitudinal direction due to a gradient of a road surface on which the electric vehicle is parked.

6. An apparatus according to claim 1, wherein said parking release motor control means comprises means for changing a magnitude and a direction of an output torque of said electric motor according to a predetermined pattern as a function of time.

7. An apparatus according to claim 1, further comprising a rotary position sensor for detecting a rotary position of said parking lock gear, and wherein said parking release motor control means comprises rotary position control means for controlling a rotary position of said electric motor, on the basis of the rotary position of said parking lock gear detected by said rotary position sensor, such that said parking lock gear and said parking lock pawl are held in a relative position in which said load of engagement therebetween is substantially zero.

8. An apparatus according to claim 4, wherein said parking release motor control means determines an output torque of said electric motor as a function of said angle of inclination detected by said vehicle inclination sensor.

9. An apparatus according to claim 5, wherein said parking release motor control means determines an output torque of said electric motor as a function of said longitudinal load detected by said load sensor.

10. An apparatus according to claim 1, wherein said parking lock gear is connected to an output shaft of said electric motor for rotation with said output shaft.

* * * * *